United States Patent
Hong

(10) Patent No.: US 7,055,570 B2
(45) Date of Patent: *Jun. 6, 2006

(54) AUTOMATED MANUFACTURING SYSTEM OF LITHIUM SECONDARY BATTERY

(75) Inventor: Ji-Jun Hong, Nonsan-si (KR)

(73) Assignee: Kokam Co., Ltd., Kyounggi-Do (KR)

( * ) Notice: Subject to any disclaimer, the term of this patent is extended or adjusted under 35 U.S.C. 154(b) by 58 days.

This patent is subject to a terminal disclaimer.

(21) Appl. No.: 10/478,625

(22) PCT Filed: May 17, 2002

(86) PCT No.: PCT/KR02/00932

§ 371 (c)(1),
(2), (4) Date: Nov. 19, 2003

(87) PCT Pub. No.: WO02/095858

PCT Pub. Date: Nov. 28, 2002

(65) Prior Publication Data

US 2004/0154160 A1    Aug. 12, 2004

(30) Foreign Application Priority Data

May 23, 2001 (KR) .............................. 2001-28493

(51) Int. Cl.
*B32B 31/20* (2006.01)

(52) U.S. Cl. .................... 156/552; 156/564; 156/565; 29/730

(58) Field of Classification Search ................ 156/443, 156/459, 461, 464, 564, 565; 29/730, 731, 29/623.1, 623.2, 623.3, 623.4, 623.5
See application file for complete search history.

(56) References Cited

U.S. PATENT DOCUMENTS 4,216,579 A * 8/1980 Murata et al. ................ 29/730
5,824,156 A * 10/1998 Watanabe et al. ............ 118/410
2002/0007552 A1* 1/2002 Singleton et al. ........... 29/623.3
2002/0160258 A1* 10/2002 Lee et al. .................... 429/130

FOREIGN PATENT DOCUMENTS

JP    56-145658    11/1981

(Continued)

OTHER PUBLICATIONS

PCT International Search Report—PCT/KR02/00932.

*Primary Examiner*—George Koch
(74) *Attorney, Agent, or Firm*—Welsh & Katz, Ltd.

(57) ABSTRACT

An automated manufacturing system of a secondary lithium battery is disclosed. The automated manufacturing system comprises: a frame; a supply unit having a separator roller installed at the frame to be rotatable so that a separator can be released from the separator roller, and can travel along a separator travel path; an adhesive applying unit disposed to have the separator travel path through the adhesive applying unit so as to continuously apply adhesive to both surfaces of the separator in a predetermined pattern; a lamination unit installed at the frame for laminating one adhesive applied surface of the separator with a plurality of positive electrode plates, and the other adhesive applied surface of the separator with a plurality of negative electrode plates simultaneously so that the electrode plates can correspond to the above pattern; a transporting unit installed at the frame to be rotatable while contacting the separator so as to cause the separator supplied from the supply unit to travel along the travel path at a predetermined speed and during predetermined time intervals via the adhesive applying unit and the lamination unit; a packing unit installed at the frame for folding and packing a batch of the separator which is laminated with the electrode plates by the lamination unit in a predetermined pattern and is transported by the transporting unit so that the positive electrode plates and the negative electrode plates can alternate with each other, and both side sections of the folded separator can have the shape of "Z"; and an unloading unit installed at the frame to be movable for unloading the packed separator to a tray unit.

25 Claims, 34 Drawing Sheets

FOREIGN PATENT DOCUMENTS

| | | |
|---|---|---|
| JP | 59-145658 | 8/1984 |
| JP | 59-157951 | 9/1984 |
| JP | 59-171458 | 9/1984 |
| JP | 63-175338 | 7/1988 |
| JP | 01-107451 | 4/1989 |
| JP | 01-274357 | 11/1989 |
| JP | 05-325976 | 12/1993 |
| JP | 10-261422 | 9/1998 |

\* cited by examiner

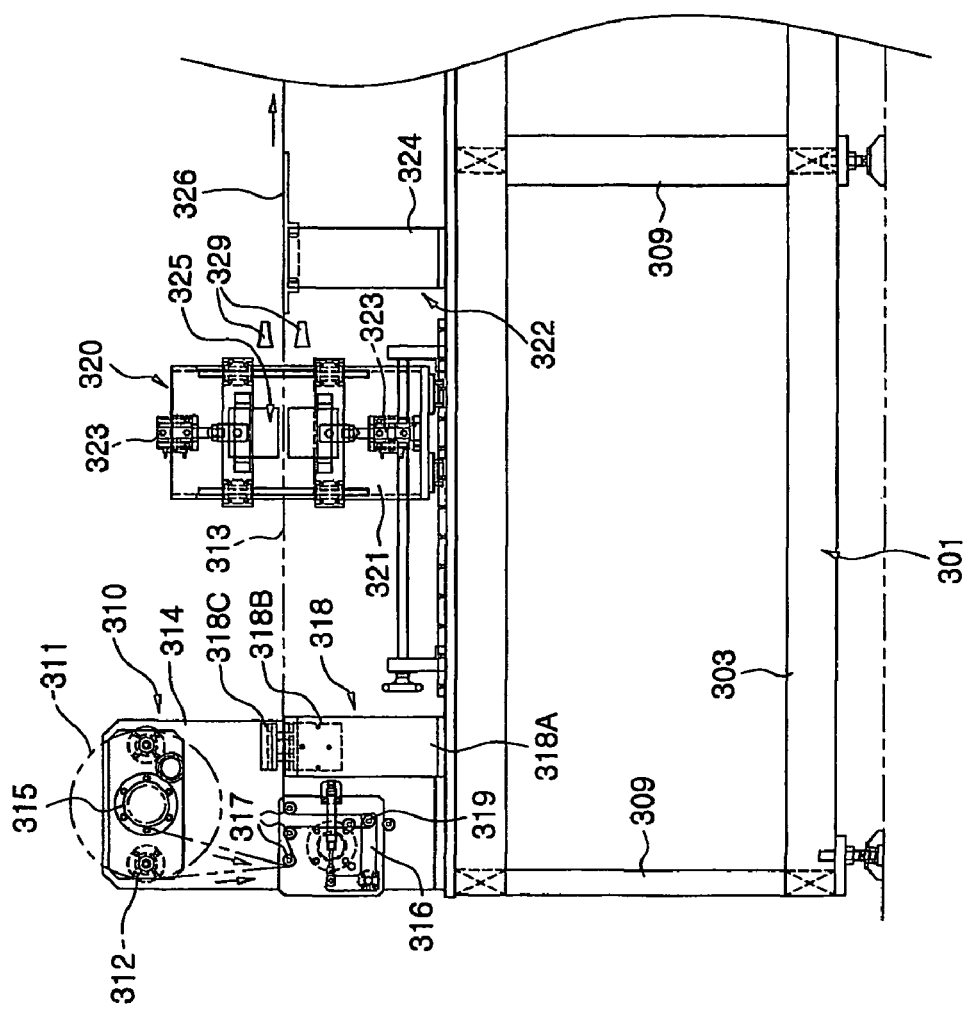

AUTOMATED MANUFACTURING SYSTEM OF LITHIUM SECONDARY BATTERY

BACKGROUND OF THE INVENTION

1. Field of the Invention

The present invention relates to an automated manufacturing system of a lithium secondary battery, and more particularly, to an automated manufacturing system of a lithium secondary battery, in which after both surfaces of a predetermined length of separator which is supplied from a roll of separator in the form of film and is arranged to travel along a horizontal path are laminated with a batch of positive electrode plates and negative electrode plates stored in magazines, a crude cells can be manufactured in a continuous process line by cutting a laminated piece of separator from the roll of separator and taping the piece of separator.

2. Description of the Related Art

In general, as portable electronic products such as video cameras, portable phones, and portable PCs become lighter, or highly functional, various development and research have been focused on batteries used as power sources of such portable electronic products. Such batteries can be used continuously by recharging the batteries.

Among various batteries, usually, nickel cadmium batteries, nickel hydrogen batteries, nickel zinc batteries, lithium secondary batteries and the like are used as power sources of electronic products, and, in particular, lithium secondary batteries are generally used taking into consideration the use life and capacity thereof.

According to types of electrolyte, the lithium secondary batteries are classified into lithium metal batteries and lithium ion batteries which employ liquid electrolyte, and lithium polymer batteries which employ solid polymer electrolyte. According to types of solid polymer electrolyte, the lithium polymer batteries are classified into full-solid type lithium polymer batteries in which organic electrolytic liquid is not included at all, and lithium ion polymer batteries employing gel type polymer electrolyte containing organic electrolytic liquid.

The lithium secondary battery is manufactured by stacking a plurality of unit cells having a separator-electrode structure so as to meet a required capacity, connecting the unit cells to each other in parallel, and packing the unit cells into a cylindrical or polyhedral can.

However, in a battery in which electrode plates are disposed according to a conventional method, there is a problem in which when the battery is overcharged, a voltage of the battery rises drastically, and the energy of the battery may be instantaneously discharged and the electrolyte may evaporate or burn, and therefore the performance of the battery and safety thereof deteriorate. In addition, there is another problem in which the process of attaching electrode taps for electrically connecting unit cells to each other is very complicate.

SUMMARY OF THE INVENTION

To solve the above-described problems, it is an objective of the present invention to provide an automated manufacturing system of a secondary battery having an improved structure capable of making manufacturing processes simple, and enhancing efficiency of assembling by simultaneously and periodically attaching, batch by batch, positive electrode plates and negative electrode plates having a predetermined size to a separator in the form of film, and, in addition, automating operations of folding the separator both surfaces of which are laminated with positive electrode plates and negative electrode plates so that both side sections of the separator can have the shape of "Z", cutting the separator, taping the folded separator, unloading the packed separator, and the like in a continuous process line.

Accordingly, to achieve the above objectives, there is provided an automated manufacturing system of a secondary lithium battery comprising: a frame; a supply unit having a separator roller installed at the frame to be rotatable so that a separator can be released from the separator roller, and can travel along a separator travel path; an adhesive applying unit disposed to have the separator travel path through the adhesive applying unit so as to continuously apply adhesive to both surfaces of the separator in a predetermined pattern; a lamination unit installed at the frame for laminating one adhesive applied surface of the separator with a plurality of positive electrode plates, and the other adhesive applied surface of the separator with a plurality of negative electrode plates simultaneously so that the electrode plates can correspond to the above pattern; a transporting unit installed at the frame to be rotatable while contacting the separator so as to periodically cause the separator supplied from the supply unit to travel along the travel path at a predetermined speed via the adhesive applying unit and the lamination unit; a packing unit installed at the frame for folding and packing a batch of the separator which is laminated with the electrode plates by the lamination unit in a predetermined pattern and is transported by the transporting unit so that the positive electrode plates and the negative electrode plates can alternate with each other, and both side sections of the folded separator can have the shape of "Z"; and an unloading unit installed at the frame to be movable for unloading the packed separator to a tray unit.

It is preferable that the travel path between the supply unit and the packing unit is arranged to be horizontal with respect to a floor.

In the automated manufacturing system of a secondary lithium battery, the supply unit comprises: a plurality of guide rollers installed at the frame to be positioned along the travel path; and a dancing roller installed at a dancing arm installed at the frame to be pivotable for storing a predetermined length of separator released from the separator roller, and for supplying the separator to the adhesive applying unit while controlling the tension of the separator.

In the automated manufacturing system of a secondary lithium battery, the supply unit further comprises a stopper member installed to be close to the supply unit for selectively stopping the separator traveling continuously.

In the automated manufacturing system of a secondary lithium battery, the adhesive applying unit comprises a pair of air injectors installed at the frame so that the distance between the injectors and the travel path can be adjusted, and the injectors can face each other.

In the automated manufacturing system of a secondary lithium battery, each air injector comprises a plurality of nozzles capable of injecting adhesive with compressed air so that a unit adhesive applied portion having a doughnut shape can be formed on a surface of the separator.

In the automated manufacturing system of a secondary lithium battery, the adhesive applying unit further comprises adhesive drying members installed to be close to the separator for drying the adhesive injected on both surfaces of the separator by the adhesive applying unit.

In the automated manufacturing system of a secondary lithium battery, the adhesive applying unit further comprises a first position adjusting member installed between the frame and the adhesive applying unit for adjusting the position of the adhesive applying unit with respect to the frame.

In the automated manufacturing system of a secondary lithium battery, the system further comprises a travel guide member installed at the frame to be position between the adhesive applying unit and the lamination unit for guiding the separator traveling along the travel path.

In the automated manufacturing system of a secondary lithium battery, the lamination unit comprises: a stacking member provided with a plurality of positive-electrode-plate storing portions each of which a multitude of positive electrode plates are stored in, and which are disposed equidistantly, and a plurality of negative-electrode-plate storing portions each of which a multitude of negative electrode plates are stored in, and which are disposed equidistantly, and are installed at the frame to be asymmetrical to the positive-electrode-plate storing portions about the separator to which adhesive has been applied to in a predetermined pattern; pairs of pivoting members installed at the frame to pivot so as to face the positive-electrode-plate storing portions and the negative-electrode-plate storing portions, respectively; and pushing members installed to be linearly movable with respect to the pivoting members so as to approach the stacking member and the separator, respectively, to attach the positive electrode plates and the negative electrode plates which are stored in the stacking member to the separator.

In the automated manufacturing system of a secondary lithium battery, the stacking member further comprises pressing means for pressing the positive electrode plates and the negative electrode plates which are stored in the positive-electrode-plate storing portions and the negative-electrode-plate storing portions, respectively, against the respective pivoting members.

In the automated manufacturing system of a secondary lithium battery, each of the pressing means comprises: an elongated hole provided at each of the positive-electrode-plate storing portions and the negative-electrode-plate storing portions; and a pressing plate which has a pressing projection to be inserted into the elongated hole, and is installed at the frame to be linearly moved by a moving member.

In the automated manufacturing system of a secondary lithium battery, each of the pressing means further comprises an elastic member installed at the pressing projection so as to give an elastic force to corresponding one of the positive electrode plates and the negative electrode plates.

In the automated manufacturing system of a secondary lithium battery, each of the pushing members further comprises a cushion member which corresponds to one of the positive electrode plates and the negative electrode plates, and is provided with a passage communicating with an absorbing member so as to hold the corresponding electrode plate stored in the stacking member with an absorbing force, and so as to attach to the separator.

In the automated manufacturing system of a secondary lithium battery, the lamination unit further comprises aligning members installed to be linearly movable with respect to the stacking member so as to align the positive electrode plates or the negative electrode plates stored in the stacking member.

In the automated manufacturing system of a secondary lithium battery, the transporting unit comprises a pair of conveyor members installed at the frame so as to circulate while contacting the separator, and so as to allow the separator to pass through a gab therebetween.

In the automated manufacturing system of a secondary lithium battery, it is preferable that the pair of conveyor members are arranged to be separated from one another when necessary.

In the automated manufacturing system of a secondary lithium battery, the packing unit comprises: a base member which is installed at the frame, and is provided with a receiving rack for receiving a batch of separator both surfaces of which are laminated with positive electrode plates and negative electrode plates in a predetermined pattern; a stopper member installed at the frame to be linearly movable so as to selectively approach one end of the base member for preventing the separator being supplied to the base member from being separated from the receiving rack; a folder member installed at the frame to be linearly movable with respect to the receiving rack so that the folder can press the separator supplied to a receiving space formed by the receiving rack and the stopper member for predetermined duration, and fold the separator so that both side sections of the folded separator can have the shape of "Z", and the positive electrode plates and the negative electrode plates can alternate with each other; and a cutting/taping member for moving the separator folded in the shape of "Z" to a predetermined area, cutting the separator at a non-electrode area to which no electrode plate is attached, and taping the folded and cut piece of separator.

In the automated manufacturing system of a secondary lithium battery, the base member comprises: a guiding jaw projected from a base plate to guide the separator supplied thereto; and a pair of recessed portions recessed into both sides of the receiving rack.

In the automated manufacturing system of a secondary lithium battery, the base member further comprises a biasing member installed at the frame for biasing the separator toward the stopper member so that the separator supplied to the receiving rack can be easily folded in the shape of "Z".

In the automated manufacturing system of a secondary lithium battery, it is preferable that the stopper member has a stopper fork for blocking both sides of the base member, and is linearly moved by a stopper moving member.

In the automated manufacturing system of a secondary lithium battery, the folder member comprises a folder plate moved by a folder moving member.

In the automated manufacturing system of a secondary lithium battery, the cutting/taping member comprises: a pair of clamp members for approaching both sides of the base member, clamping both sides of a piece of separator folded in the shape of "Z", and moving the piece of separator horizontally to a taping position; a cutting member installed at the frame to be movable for cutting the separator at the leading end of the base member after the separator has been moved by the clamp member; a tape supplying member installed at the frame to attach one end of tape to the piece of separator after a tape roller around which the tape is wound is moved along a tape travel path; clamp rotating members installed at the frame for rotating the clamp members predetermined times so that the piece of separator can be taped while the piece of separator to which one end of the tape is attached is rotated at both ends thereof; and a tape cutting member installed at the tape supplying member to be movable for cutting the loose end portion of the tape extended from the packed piece of separator which has been rotated by the clamp rotating members and has been packed with the tape.

In the automated manufacturing system of a secondary lithium battery, the cutting/taping member further comprises a holder member installed at the frame to be raised and lowered so that the holder member can approach the tape supplying member and contact one surface of the separator to prevent the separator from fluttering before the separator is cut by the cutting member.

In the automated manufacturing system of a secondary lithium battery, the unloading unit comprises: a first unloading member installed at the frame so that the first unloading member can clamp the piece of separator packed at the packing unit, move linearly toward the tray unit, pivot by an angle of 180°, and move vertically; and a second unloading member installed at the frame so as to clamp the separator clamped by the first unloading member, and unload the separator to the tray unit by pivoting with an angle of 180° and moving vertically.

In the automated manufacturing system of a secondary lithium battery, the system further comprises a second position adjusting member installed at the frame for collectively adjusting positions of the transporting unit, the packing unit and the unloading unit to correspond to the number of electrode plates to be laminated.

BRIEF DESCRIPTION OF THE DRAWINGS

The above objective and advantages of the present invention will become more apparent by describing in detail preferred embodiments thereof with reference to the attached drawings in which:

FIGS. 2A and 2B are front and plan views of a supply unit and an adhesive applying unit that are shown in FIG. 1;

DETAILED DESCRIPTION OF THE INVENTION

Now, an automated manufacturing system of a lithium secondary battery according to a preferred embodiment of the present invention will be described in detail with reference to the attached drawings.

Figure 1:
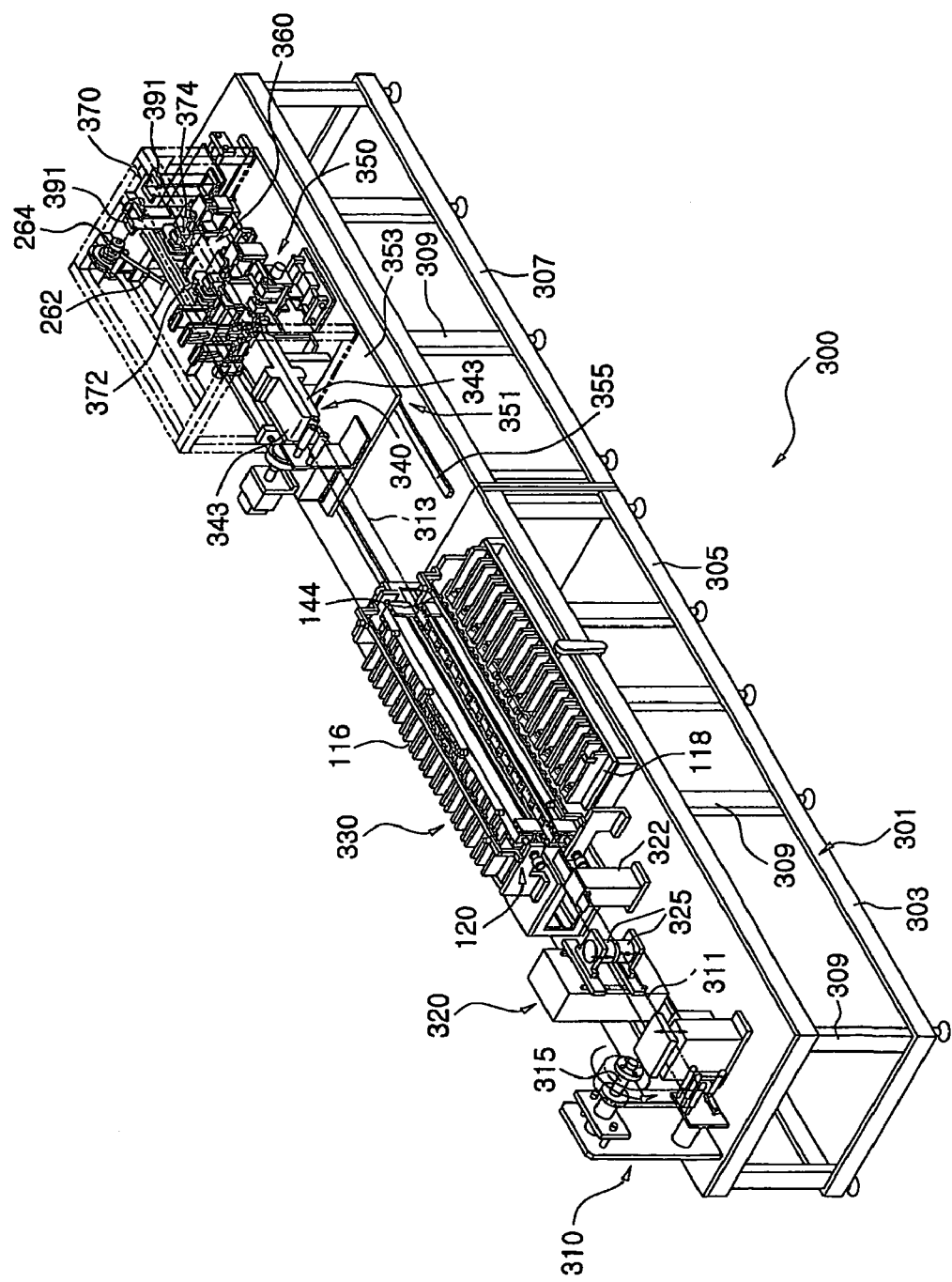
FIG. 1 is a schematic perspective view illustrating an automated manufacturing system of a lithium secondary battery according to a preferred embodiment of the present invention.

Referring to FIG. 1, a system according to the present invention can be divided into the following various units, and all the units may be installed at one frame or respective separate frames that can be integrated into one. In addition, each unit is servo-controlled by a control unit (not shown).

The system 300 comprises a supply unit 310 having a separator roller 315 rotatably installed at a frame 301 so that a separator 311 can be released and travel along a travel path 313, an adhesive applying unit 320 disposed to have the travel path 313 through the adhesive applying unit 320 so as to continuously apply adhesive to both surfaces of the separator 311 in a predetermined pattern, a lamination unit 330 for simultaneously laminating both a plurality of positive electrode plates and a plurality of negative electrode plates on respective surfaces of the separator 311 to which adhesive has been applied so that positive and negative electrode plates can correspond to the predetermined pattern, a transporting unit 340 which contacts the separator 311 supplied from the supply unit 310, and rotates so as to cause the separator 311 to travel along its travel path 313 at a predetermined speed and during predetermined time intervals, a packing unit 350 for folding and packing one batch of the separator 311 which has been laminated with the positive and negative electrode plates in the predetermined pattern by the lamination unit 330 so that the positive and negative electrode plates alternate with each other, and the section of the separator 311 can have the shape of "Z", and an unloading unit for unloading the packed separator 311 to a tray unit 370.

The frame 301 can be divided into a first frame 303 on which the supply unit 310 and the adhesive applying unit 320 are installed, a second frame 305 on which the lamination unit 330 is installed, and a third frame unit 307 on which the transporting unit 340, the packing unit 350, the unloading unit 360 and the tray unit 370 are installed.

The frame 301 may be divided into a lower frame at which a plurality of supporting pillars 309 for supporting the system 300 apart from a floor are installed, and an upper frame on which components of the system 300 are seated. Various driving motors, a vacuum system, an air system, an electronic system, an adhesive supplying system, and the like are provided at the lower frame. It is preferable that the upper surface of the upper frame is arranged to be in an accurately horizontal state.

Since all the following components of the present invention, which will be described below, are installed at the frame 301, and various brackets, blocks, plates, housings, covers, collars, and the like are ancillary elements for installing respective components at the frame 301, it is made a principle that the ancillary elements are generally called the frame 301 except particular cases.

Figure 2B:
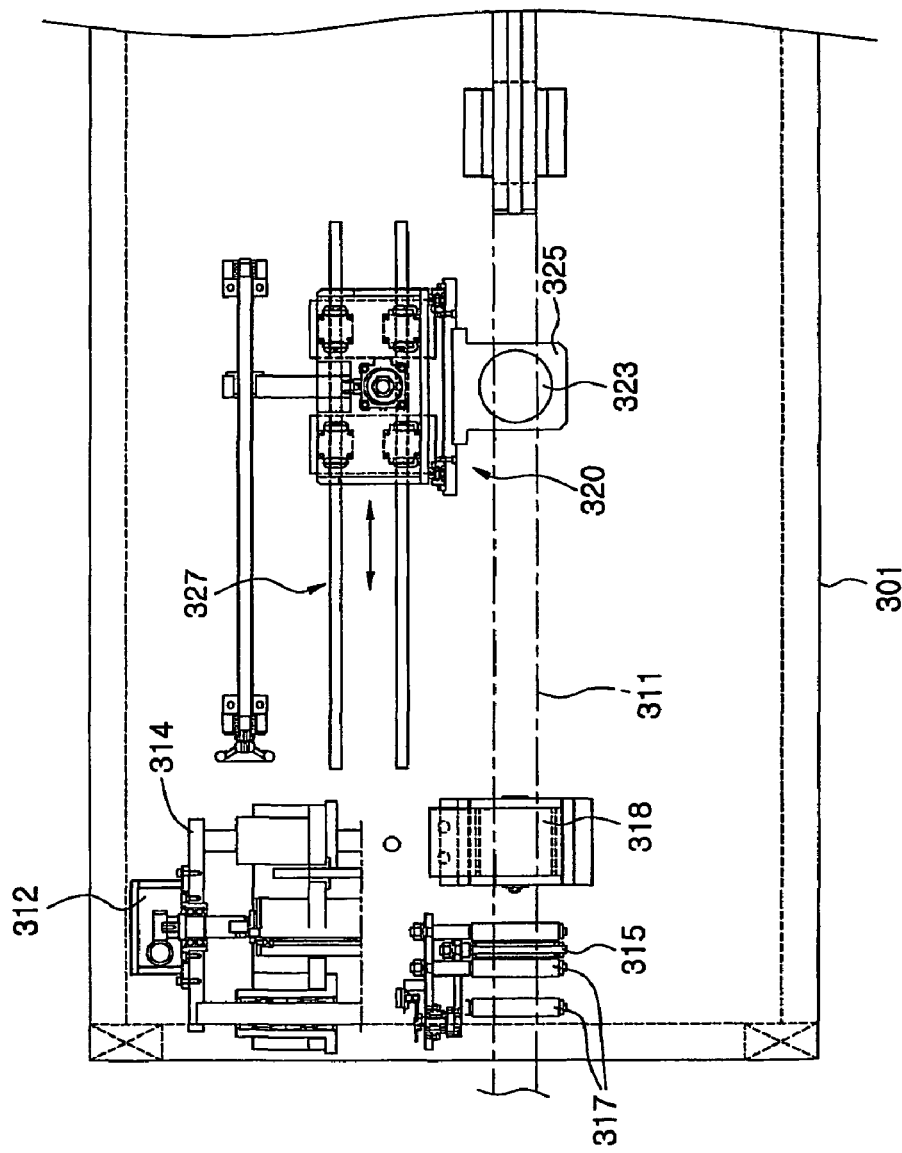

FIGS. 2A and 2B are front and plan views of a supply unit and an adhesive applying unit that are shown in FIG. 1.

Referring to FIGS. 2A and 2B, the supply unit 310 comprises the above-mentioned separator roller 315, a plurality of guide rollers 317 for guiding the travel of the separator 311, and a dancing roller 319 for storing a predetermined length of the separator 311 released from the separator roller 315, and, in addition, for adjusting the tension of the separator 311.

The separator roller 315 may be configured so that the separator roller 315 is naturally rotated by the tension of the separator 311, or may be configured so that the separator roller 315 is rotated by the tension of the separator 311 while the tension is adjusted by a servomotor 312 which is controlled by an encoder 347, and is interlocked with the encoder 347. Here, the separator 311 is intended to electrically insulate the positive electrode and the negative electrode from each other in a battery, and it is preferable that the separator 311 having a single-layered or multi-layered structure is made of a porous polymeric film of polyethylene (PE) or polypropylene (PP). The width and thickness of the separator 311 may vary with the type of finally produced battery.

The guide rollers 317 are horizontally installed at a roller bracket 314 installed on the frame 301, and rotate freely while contacting the separator 311. The dancing roller 319 is installed at a dancing arm 316 disposed at the roller bracket 314 to be pivotable.

While the dancing roller 319 controls the tension of the separator 311 which maintains its predetermined travel path according to a zigzag travel path 313 formed by the guide rollers 317, and is drawn from the separator roller 315 by the pivoting motion of the dancing bar 316, the dancing roller 319 is re-supplied with the drawn quantity of the separator 311 from the separator roller 315. To this end, the supply unit 310 is provided with a potentiometer (not shown) which is controlled by the control unit and is intended to decide the tension of the separator 311 and the time of supply of the separator 311 by detecting a pivoting position of the dancing arm 316.

In addition, the supply unit 310 is provided with a stopper member 318 for selectively stopping the separator 311 which continuously travels via the guide rollers 317. The stopper member 318 comprises a clamp base 318A fixedly installed on the frame 301 to be in a position below the travel path 313, and a supply stopper 318C which is positioned over the travel path 313, and is raised and lowered by a stopper cylinder 318B so as to be able to selectively approach the upper surface of the clamp base 318A.

Figure 3:
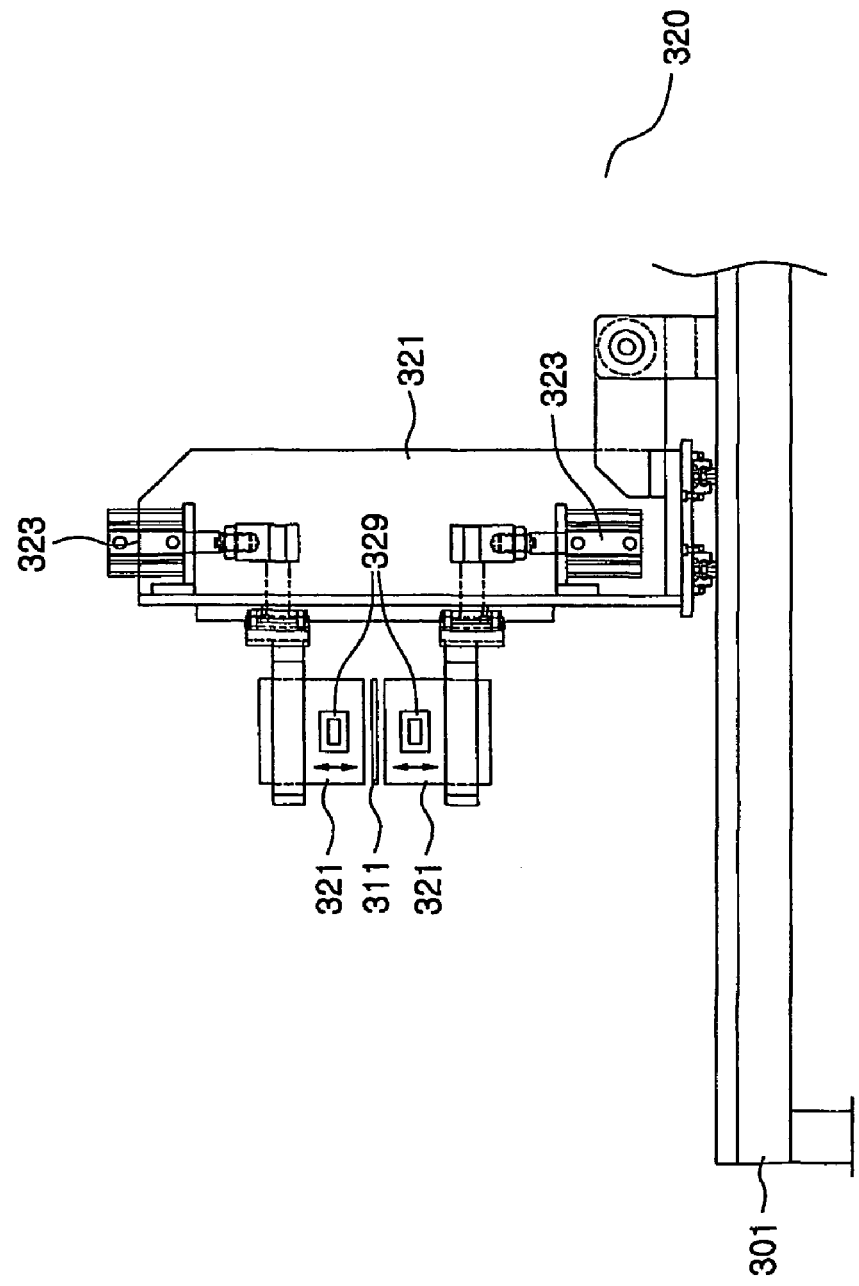
FIG. 3 is a right side view of the adhesive applying unit portion shown in FIG. 1.

FIG. 3 is a right-side view of the adhesive applying unit portion of FIG. 1.

As shown in FIG. 1 through FIG. 3, the adhesive applying unit 320 comprises a bracket 321 installed on the frame 301 so that the position of the bracket 321 can be adjustable with respect to the frame 301, and a pair of air injectors 325 which are installed at the bracket 321 to be raised and lowered by respective cylinders 323 and are separately positioned over and below the travel path 313.

The adhesive applying unit 320 must be set at a corresponding position along the travel path 313 depending on the type and number of positive electrode plates and negative electrode plates which are adhered to the separator 311 and the type of battery. Therefore, the bracket 321 is installed on the frame 301 so that the position of the bracket 321 can be adjusted with respect to the frame 301 by a first position adjusting member 327 comprising an LM guide, movement rails, a first handle, and the like.

The air injector 325 is a device to which the printing principle of 'Ink-jet Marking' is applied, and is intended to jet adhesive liquid stored in a predetermined container through a nozzle by using compressed air. It is preferable that the nozzle of the air injector 325 is capable of forming an adhesive pattern having a predetermined shape on the surface of the separator 311.

Figure 4:
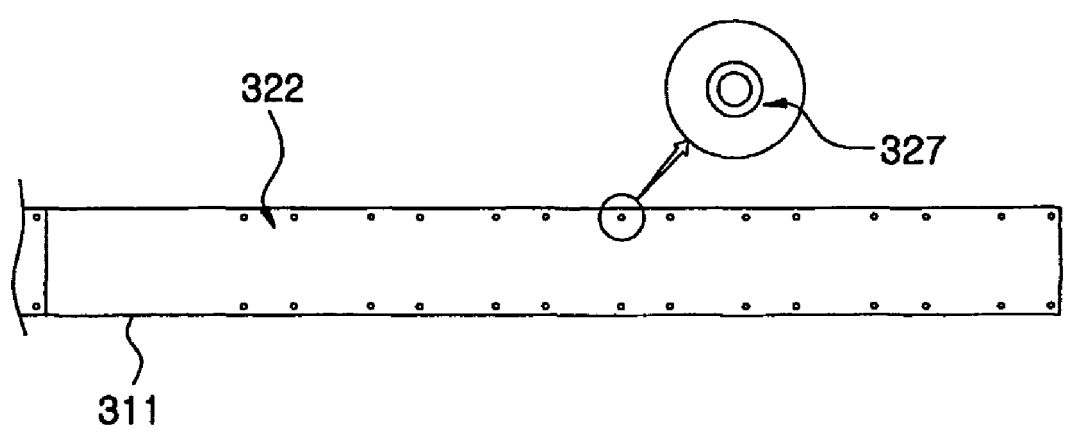
FIG. 4 is a schematic plan view illustrating a distribution pattern of adhesive applied to a portion of a separator strip by the adhesive applying unit shown in FIG. 1.

FIG. 4 is a plan view illustrating a separator a surface of which an adhesive has been applied to by the adhesive applying unit shown in FIG. 1.

As shown in FIG. 4, it is preferable that a unit adhesive applied portion has an annular shape (a doughnut shape). The reason is that the contacting area between the adhesive layer and an electrode plate and the thickness of the adhesive layer can be reduced, and excessive consumption of the adhesive can be prevented. Therefore, the so-called string effect can be reduced, and, ultimately, electron conductivity of the electrode plate can be enhanced. To this end, it is preferable that the inner diameter of the nozzle of the air injector 325 is about 50~300 µm. As a matter of course, the nozzle may jet the adhesive to a surface of the separator 311 in a dot shape, or in a line shape, or may jet the adhesive to the whole surface of the separator 311.

As shown in FIG. 3, the air injectors 325 are symmetrically disposed with respect to the travel path 313. Therefore, the adhesive jetted by the two air injectors 325 disposed to face each other is simultaneously applied to both surfaces of the horizontally traveling separator 311. Accordingly, since the adhesive is simultaneously applied to both surfaces of the separator 311, efficiency of the adhesive applying process can be enhanced.

In addition, in order to dry the adhesive jetted on the both surfaces of the separator 311, adhesive drying members 329 are installed over and below the travel path 313. It is preferable that the adhesive drying member 329 has an air nozzle structure for jetting dry air, and the operation thereof is selectively controlled by the control unit.

As shown in FIG. 1 and FIGS. 2A and 2B, a travel guide member 322 is installed between the adhesive applying unit 320 and the lamination unit 330. The travel guide member 322 is intended to prevent the separator 311 having passed the adhesive applying unit 320 from being loosened, and is installed to be disposed below the travel path 313 and to be able to contact the lower surface of the separator 311. The travel guide member 322 comprises a guide block 324 installed on the frame 301, and a side guide 326 which has a finished upper surface and is installed on the guide block 324 to project toward the adhesive applying unit 320 and the lamination unit 330.

Figure 5A:
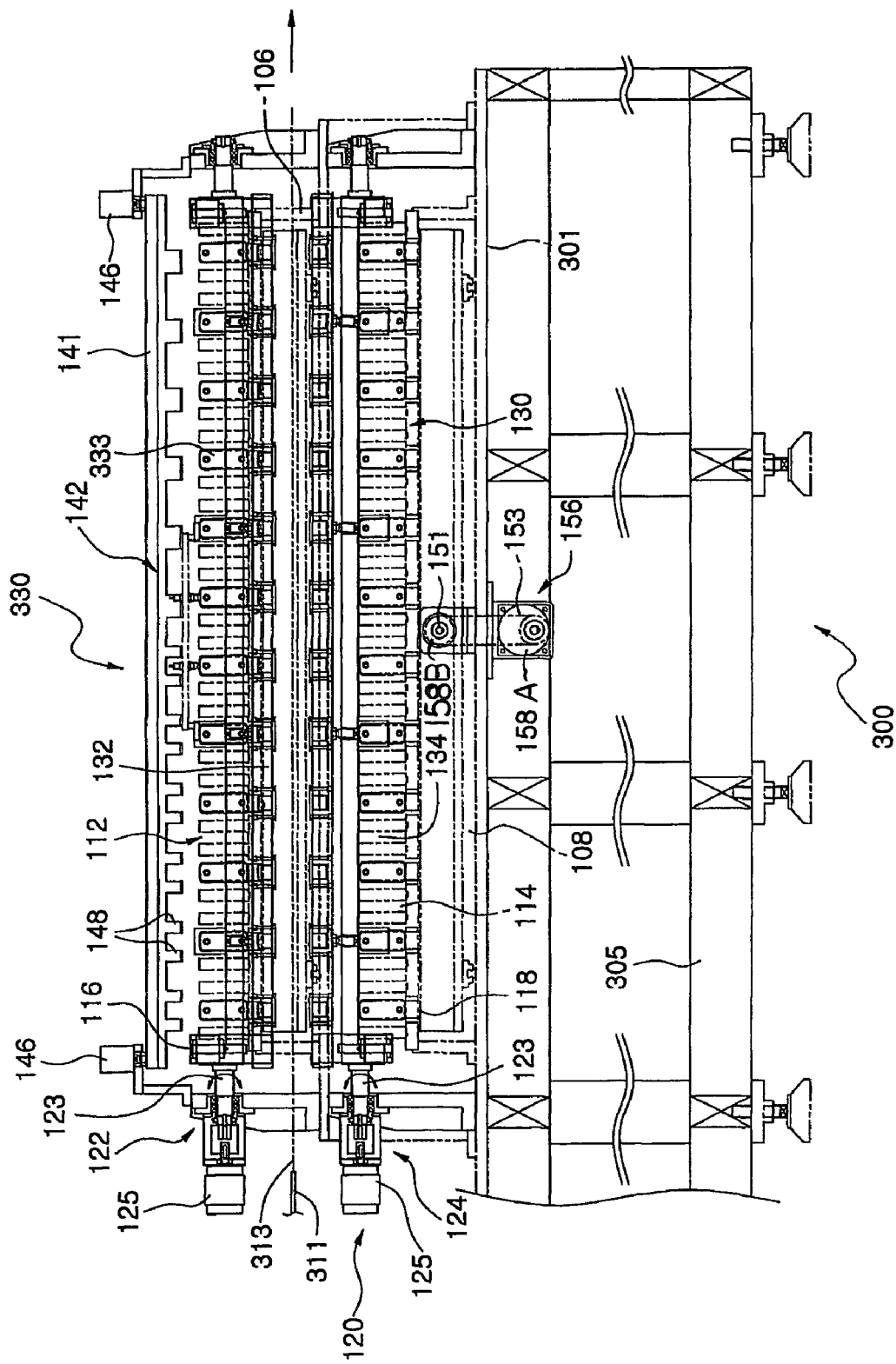
FIGS. 5A, 5B, and 5C are front, plan and right side views of a lamination unit portion shown in FIG. 1.
Figure 5B:
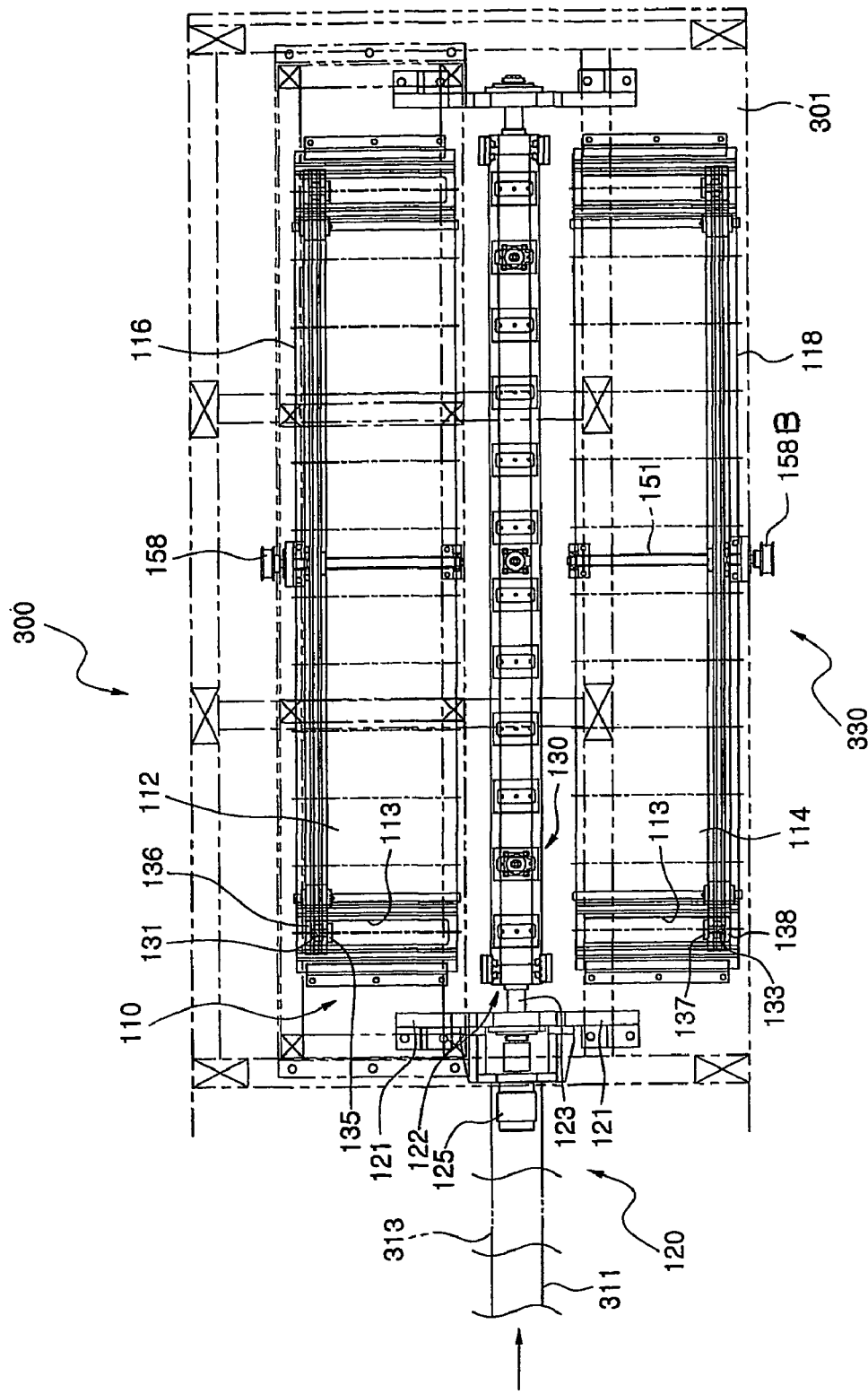
Figure 5C:
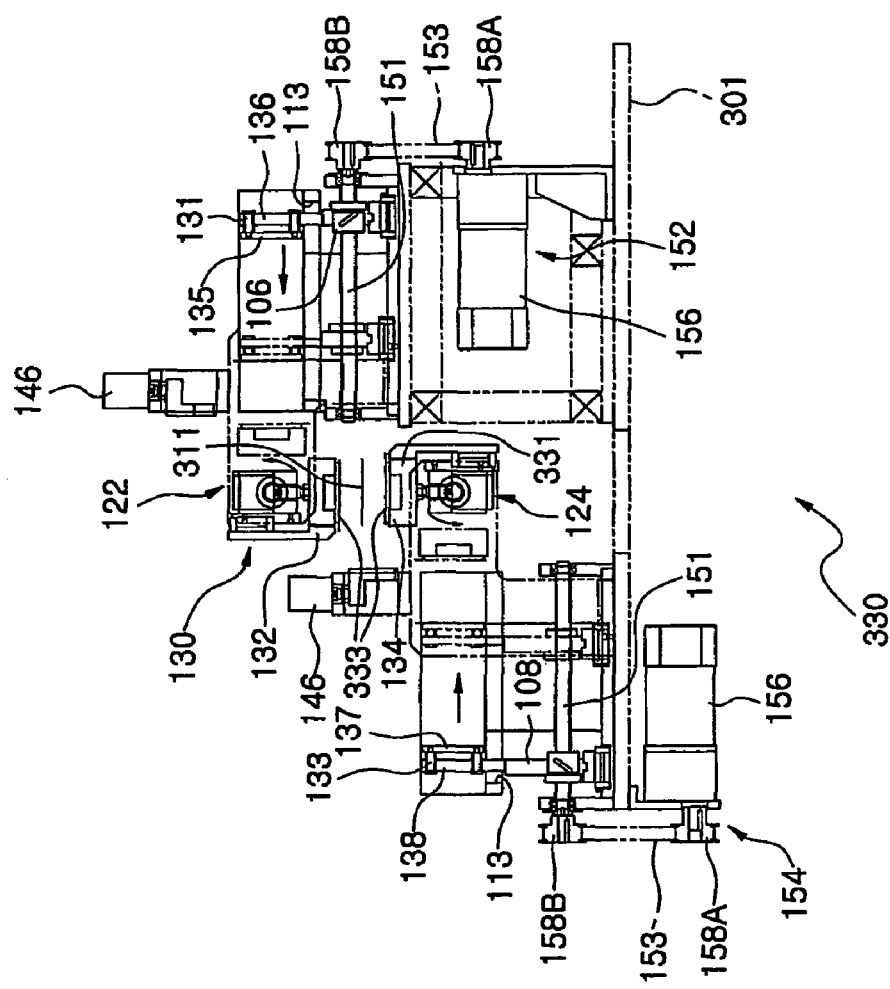

FIGS. 5A through 5C are, respectively, front, plan, and right side views of the lamination unit portion of FIG. 1.

As shown in FIG. 1 and FIGS. 5A through 5C, the lamination unit 330 is intended to simultaneously attach and laminate a batch of positive electrode plates and negative electrode plates to two respective surfaces of the separator 311, to which the adhesive has been applied in a predetermined pattern, so that the electrode plates correspond to the predetermined pattern.

The lamination unit 330 comprises a stacking member 110 provided with a plurality of positive-electrode-plate storing portions 112 each of which a multitude of positive electrode plates are stored in, and a plurality of negative-electrode-plate storing portions 114 each of which a multitude of negative electrode plates are stored in, which, i.e., the portions 112 and the portions 114, are disposed to be asymmetrical about the separator 311, a pivoting member 120 comprised of positive-electrode-plate pivoting members 122 and negative-electrode-plate pivoting members 124 which are installed at the frame 301 to be pivotable so as to face the positive-electrode-plate storing portions 112 and the negative-electrode-plate storing portions 114, respectively, and a pushing member 130 comprising positive-electrode-plate pushing members 132 and negative-electrode-plate pushing members 134 which are installed to be linearly movable with respect to the respective positive-electrode-plate pivoting members 122 and the respective negative-electrode-plate pivoting members 124 so that the positive electrode plates 102 and the negative electrode plates 104 which are stored in the stacking member 110 can be attached and laminated to the separator 311, respectively.

The stacking member 110 is a storage place for arranging and storing positive electrode plates and negative electrode plates so that the positive electrode plates and the negative electrode plates which are required for a battery, (for example, when 5 positive electrode plates are required for a battery, 6 negative electrode plates are disposed so that one more negative electrode plate can be attached to a separator), can be attached to a separator simultaneously, and is divided into a positive-electrode-plate magazine 116 and a negative-electrode-plate magazine 118 for storing positive electrode plates and negative electrode plates, respectively. The positive-electrode-plate magazine 116 and the negative-electrode-plate magazine 118 are asymmetrically disposed with respect to the horizontal travel path 313 of the separator 311. That is, when the positive-electrode-plate magazine 116 is positioned at a first step, the negative-electrode-plate magazine 118 is positioned at a second step. As a matter of course, the opposite is possible. Though the positions thereof and the facing directions thereof are different from each other, the positive-electrode-plate magazine 116 and the negative-electrode-plate magazine 118 have the same structure. The positive electrode plate 102 is a standardized product made by applying a positive active material such as $LiCO_2$, or $LiMn_2O_2$ having a spinel structure or a layered structure to the surface of a metal plate such as an aluminium foil, drying the applied positive active material, cutting the metal plate into pieces of a predetermined size, and providing a positive tab at a predetermined position. The negative electrode plate 104 is a standardized product made by applying a negative active material such as a graphite material or a carbon material processed to have electrochemical characteristics, for example, mesocarbon microbeads, and meso-phase pitch carbon film to the surface of a metal plate such as a copper foil, drying the applied negative active material, cutting the metal plate into pieces of a predetermined size, and providing a negative tab at a predetermined position.

The positive-electrode-plate magazine 116 and the negative-electrode-plate magazine 118 in which a plurality of standardized positive electrode plates and a plurality of standardized negative electrode plates are stored respectively are provided with twelve positive-electrode-plate storing portions 112 and twelve negative-electrode-plate storing portions 114 which are disposed to be equidistant from each other by taking into consideration the thickness of the positive and negative electrode plates and the length of folded portion of the separator when the separator is folded in the shape of "Z". At the bottoms of the positive-electrode-plate storing portions 112 and the negative-electrode-plate storing portions 114, respective elongated holes 113 are formed. Positive-electrode-plate pressing projections 136 of positive-electrode-plate pressing plates 106 installed at the frame 301 to be linearly movable are inserted into respective elongated holes 113, and negative-electrode-plate pressing projections 138 of negative-electrode-plate pressing plates 108 installed at the frame 301 to be linearly movable are inserted into respective elongated holes 113. The elongated holes 113 and the pressing projections 136 and 138 constitute pressing means for pressing the positive-electrode-plates and the negative-electrode-plates which are stored in the respective positive-electrode-plate storing portions 112 and the respective negative-electrode-plate storing portions 114 toward the travel path 313.

The pressing means further comprise positive-electrode-plate elastic members 131 and negative-electrode-plate elastic members 133. The elastic members 131 and 133 are intended to give elastic forces to the positive electrode plates 102 and the negative electrodes plates 104 which are stored in the positive-electrode-plate storing portions 112 and the negative-electrode-plate storing portions 114, and are installed at the pressing projections 136 and 138. The elastic members 131 and 133 comprise pressing plates 135 and 137 installed to contact a positive electrode plate 102 and a negative electrode plate 104, respectively, guide rods interposed between the pressing plates 135 and 137 and the pressing projections 136 and 138, and springs installed at the outer circumferential surfaces of the guide rods.

The positive-electrode-plate magazine 116 and the negative-electrode-plate magazine 118 further comprise a positive-electrode-plate aligning member 142 and a negative-electrode-plate aligning member 144 which are installed to be linearly movable with respect to the stacking member 110 so as to selectively align positive electrode plates 102 or negative electrode plates 104.

The positive-electrode-plate aligning member 142 and the negative-electrode-plate aligning member 144 comprise a positive-electrode-plate aligning bar 141 and a negative-electrode-plate aligning bar (not shown) which are disposed to have a predetermined space from and to be parallel to the respective leading ends of the magazines 116 and 118, and are moved upward and downward by aligning cylinders 146, and a plurality of aligning projections 148 installed at the positive-electrode-plate aligning bar 141 and the negative-electrode-plate aligning bar in the lengthwise directions thereof so as to contact both edges of the positive electrode plates 102 and the negative electrode plates 104. It is preferable that a touch pad made of a soft material is installed at the leading end of the aligning projection 148 so as to not damage the positive electrode plate 102 or the negative electrode plate 104.

The positive-electrode-plate pressing plate 106 and the negative-electrode-plate pressing plate 108 are linearly moved with respect to the frame 301 by a positive-electrode-plate moving member 152 and a negative-electrode-plate moving member 154, respectively. Each of the plate moving members 152 and 154 comprises a timing pulley 158A provided at the rotating shaft of a motor 156 which is installed at the frame 301 and is controlled by the control unit, a timing pulley 158B provided at one end of a ball screw 151 which is installed at the frame 301 through the pressing plates 106 and 108 to be rotatable, and a timing belt 153 for connecting the timing pulleys 158A and 158B.

The pivoting member 120 pivots at an angle of 90° between the travel path 313 and the positive-electrode-plate magazine 116 and the negative-electrode-plate magazine 118. Each of the positive-electrode-plate pivoting members 122 and the negative-electrode-plate pivoting members 124 comprises a bracket 121 installed at the frame 301, a rotary shaft 123 installed at the bracket 121 to be parallel to the travel path 313, and a cylinder 125 which is installed at the bracket 121 to rotate the rotary shaft 123 at an angle of 90° and is controlled by the control unit.

The positive-electrode-plate pushing members 132 and the negative-electrode-plate pushing members 134 are installed to be linearly movable with respect to the positive-electrode-plate pivoting members 122 and the negative-electrode-plate pivoting members 124 so that the pushing members 132 and 134 can approach or be separated from the stacking member 110 and the separator 311, and, therefore, can hold a batch of positive electrode plates 102 and negative electrode plates 104 which are stored in the positive-electrode-plate magazine 116 and the negative-electrode-plate magazine 118 by using respective absorbing forces, and attach the electrode plates 102 and 104 to both surfaces of the separator 311.

Each of the positive-electrode-plate pushing members 132 and the negative-electrode-plate pushing members 134 comprises a pushing bar 331 provided with an absorbing passage therein to communicate with an absorbing member (not shown), and a cushion member 333 installed at the pushing bar 331 to contact a positive electrode plate 102 or a negative electrode plate 104.

Figure 6A:
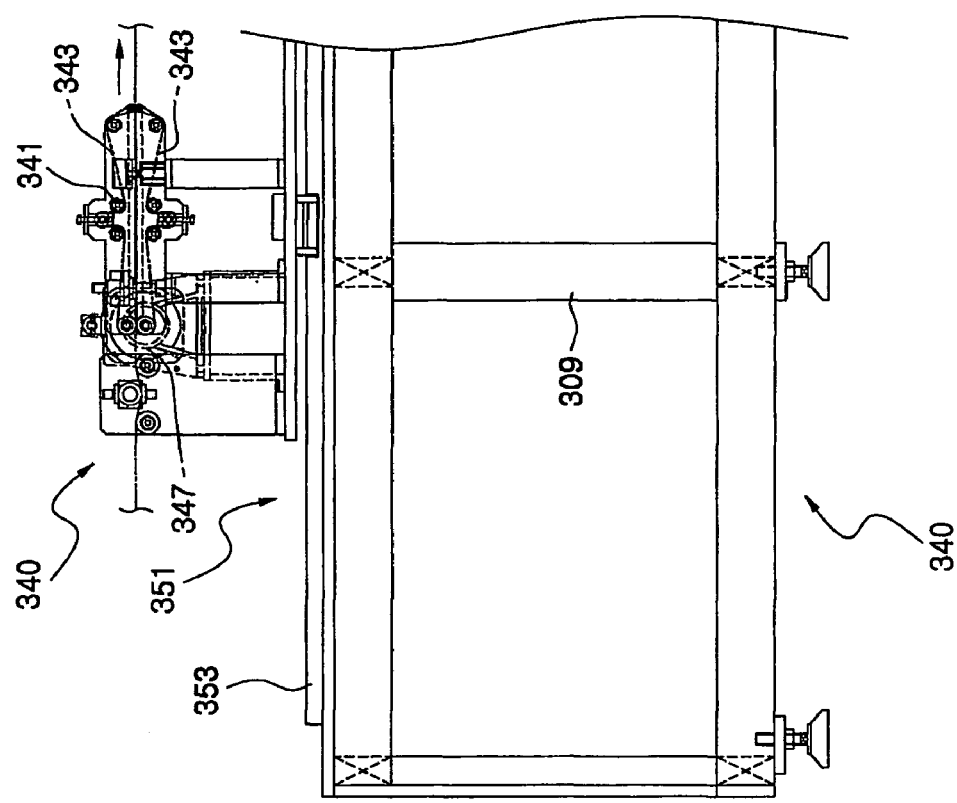
FIGS. 6A, 6B, and 6C are front, plan and right side views of a transporting unit portion shown in FIG. 1.
Figure 6B:
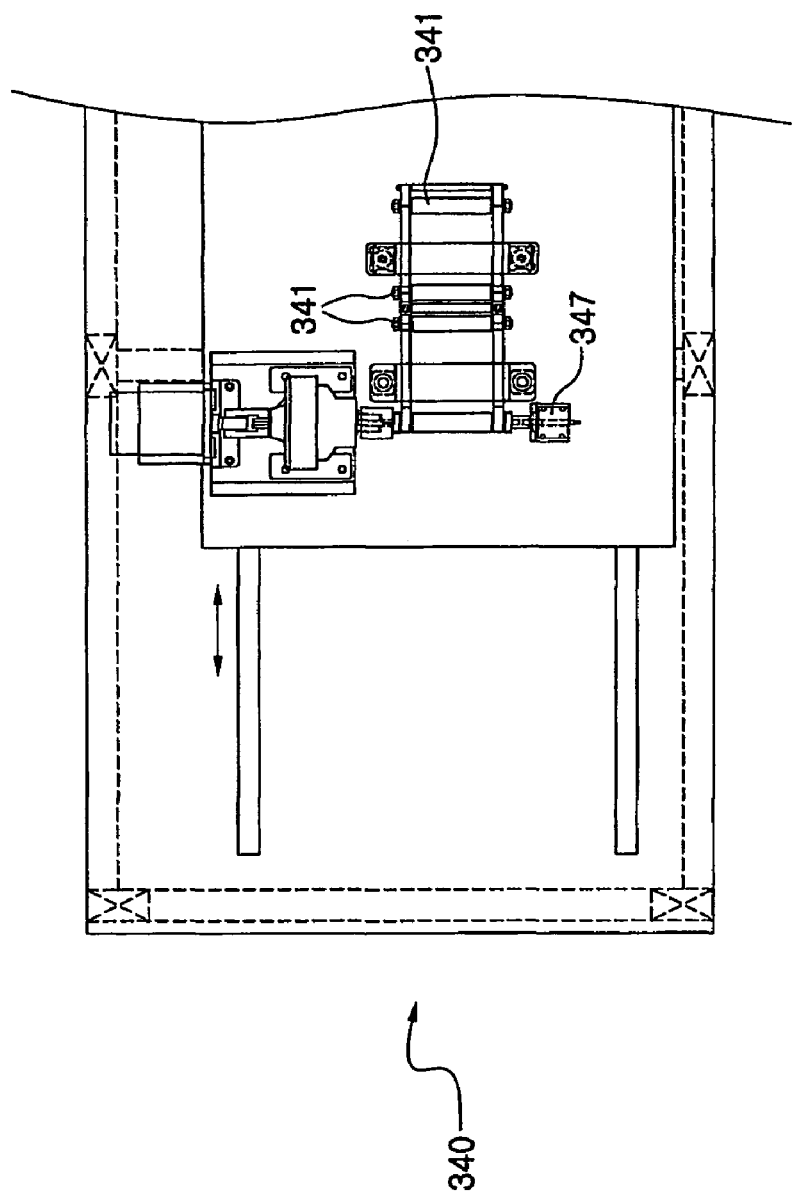
Figure 6C:
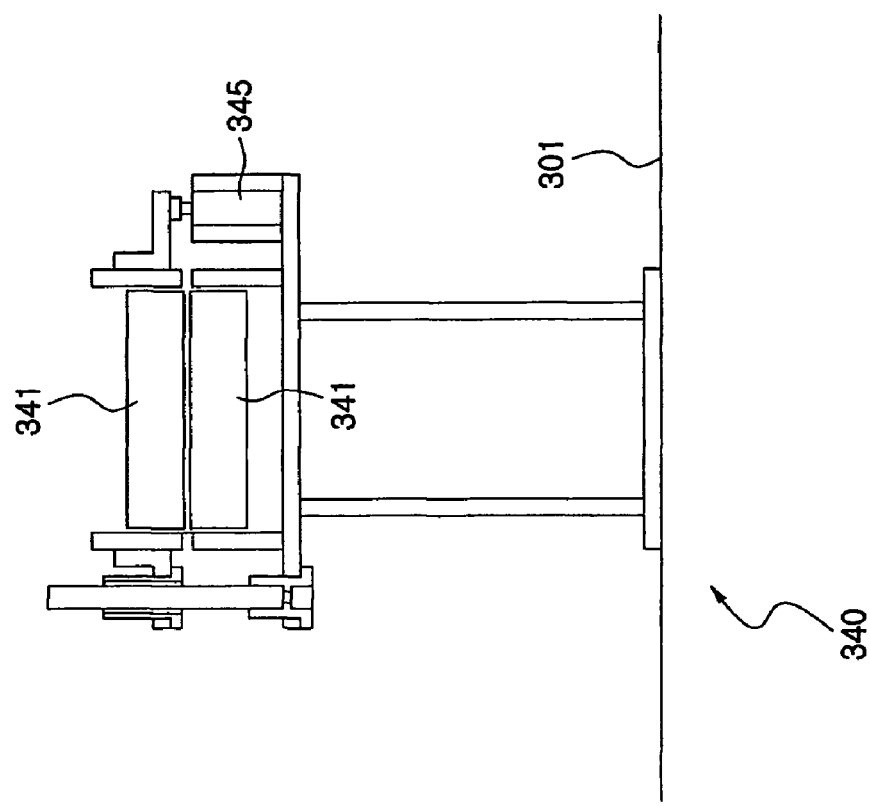

FIGS. 6A through 6C are front, plan, and right side views of the transporting unit portion of FIG. 1, respectively.

Referring to FIG. 1 and FIGS. 6A through 6C, the transporting unit 340 comprises a pair of conveyor members 343 each of which encircles a plurality of conveyor rollers 341 installed at the frame to be rotatable so that the conveyor members 343 can contact both surfaces of the separator 311 and cause the separator 311 to travel therebetween.

The conveyor members 343 are divided into an upper conveyor and a lower conveyor, and the upper conveyor is installed to be raised apart from the lower conveyor when necessary. To this end, the upper conveyor is arranged to be moved by a conveyor cylinder 345.

The transporting unit 340 is a power source to selectively cause the separator 311 to travel through the travel path 313, and an encoder 347 which is controlled by the control unit and is interlocked with the supply unit 310 is installed in the vicinity of the transporting unit 340. It is preferable that the encoder 347 is programmed to confirm information transferred from the control unit and to perform controlling of preset values, for example, the travel speed and stop position of the separator 311, the supply speed of the separator 311 released from the separator roller 315 of the supply unit 310, the lengths of the areas of the separator 311, to which the positive electrode plate 102 or the negative electrode plate 104 is attached (electrode plate area) and neither of them is attached (and non-electrode-plate area).

Figure 7:
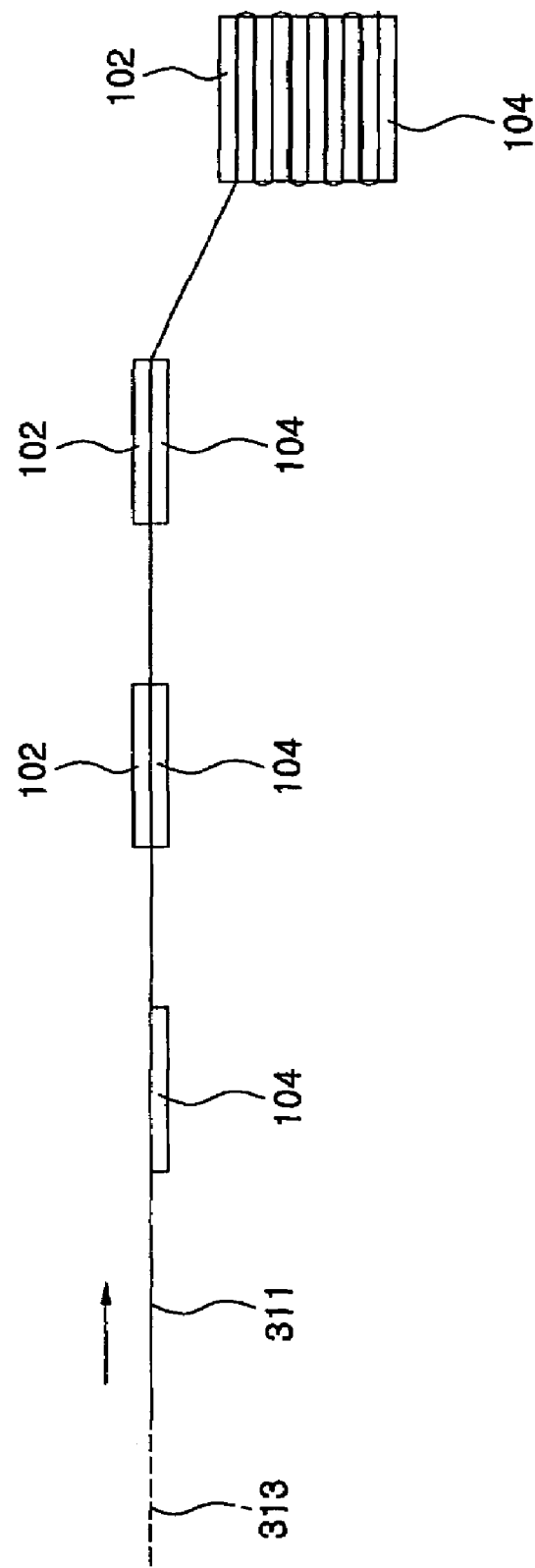
FIG. 7 is a front view illustrating an example in which the separator strip is folded in the shape of "Z" by the lamination unit shown in FIG. 1.

The packing unit 350 is intended to fold the separator 311 supplied through the leading end of the transporting unit 340, after the separator 311 is laminated with the positive and negative electrode plates 102 and 104 by the lamination unit 330, so that the section of the separator 311 can have the shape of "Z" as shown in FIG. 7, and to tape the folded separator 311 with a tape.

Figure 8A:
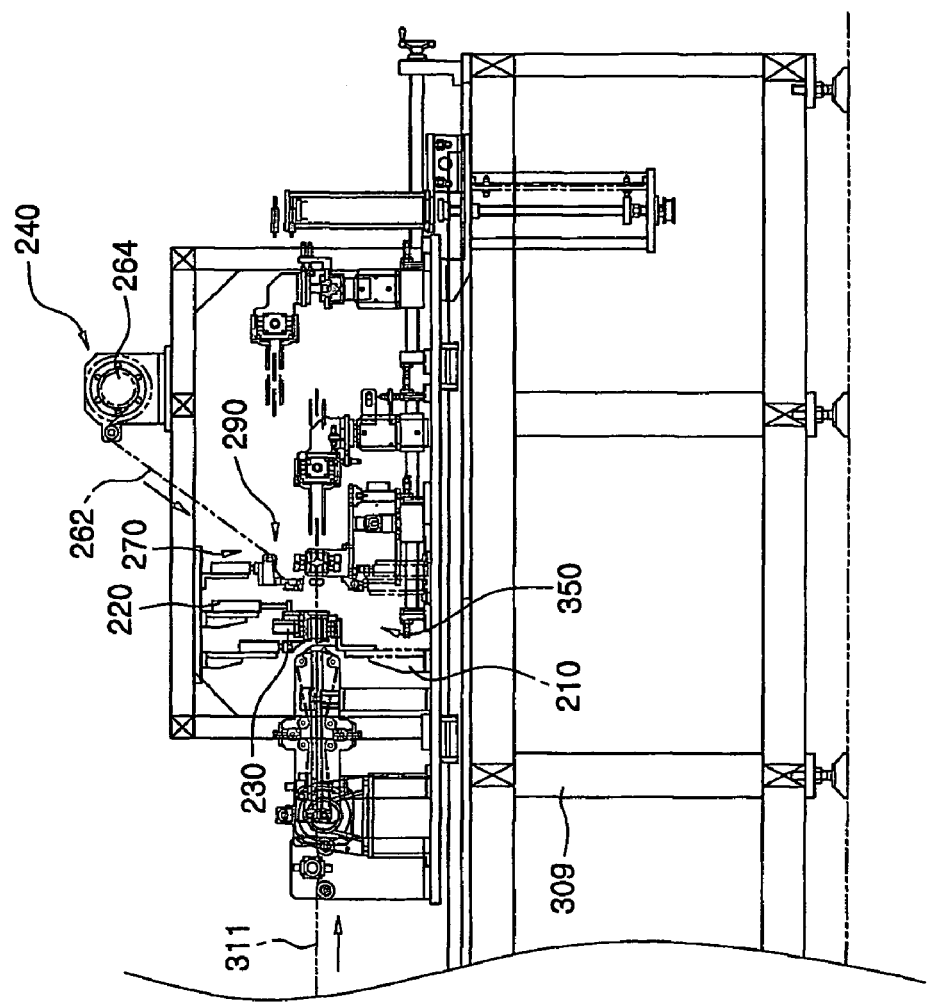
FIGS. 8A and 8B are front and plan views of a packing unit shown in FIG. 1.
Figure 8B:
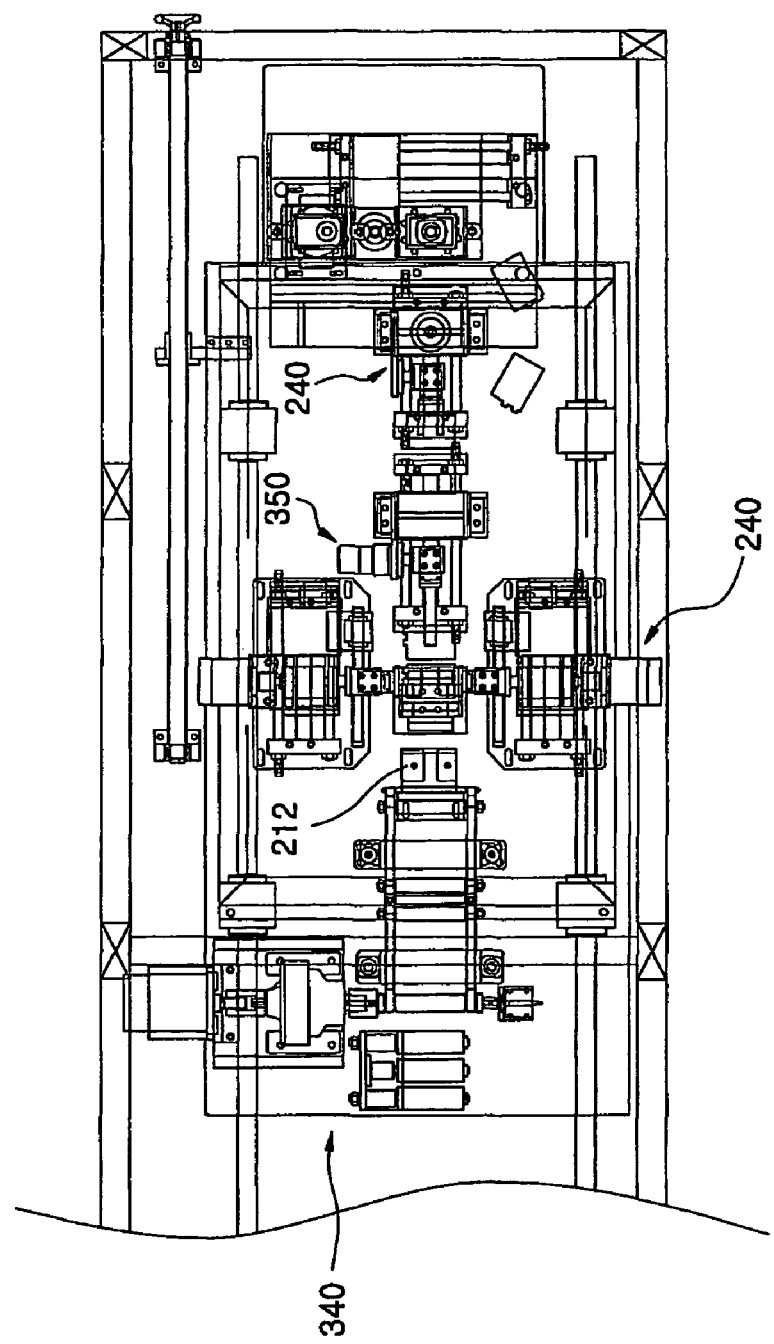

FIGS. 8A and 8B are front and plan views of the packing unit portion shown in FIG. 1.

Referring FIG. 1 and FIGS. 8A and 8B, the packing unit 350 comprises a portion of the frame 301, a base member 210 to which one batch of the separator 311 both surfaces of which have been laminated with a plurality of positive and negative electrode plates 102 and 104 in a predetermined pattern is supplied, and in which the one batch of the separator 311 is received, a stopper member 220 installed at the frame 301 to be raised and lowered so that the separator 311 received in the base member 210 can be prevented from being separated from the receiving rack 212, a folder member 230 continuously reciprocating to fold the separator 311 supplied to a receiving space 214 formed by the receiving rack 212 and the stopper member 220 so that the section of the separator 311 can have the shape of "Z", a cutting/taping member 240 for moving the separator 311 folded in the shape of "Z" to a predetermined taping position, for cutting a non-electrode-plate area of the separator 311 to which any electrode plate is not attached, and for taping the cut separator 311.

Figure 9A:
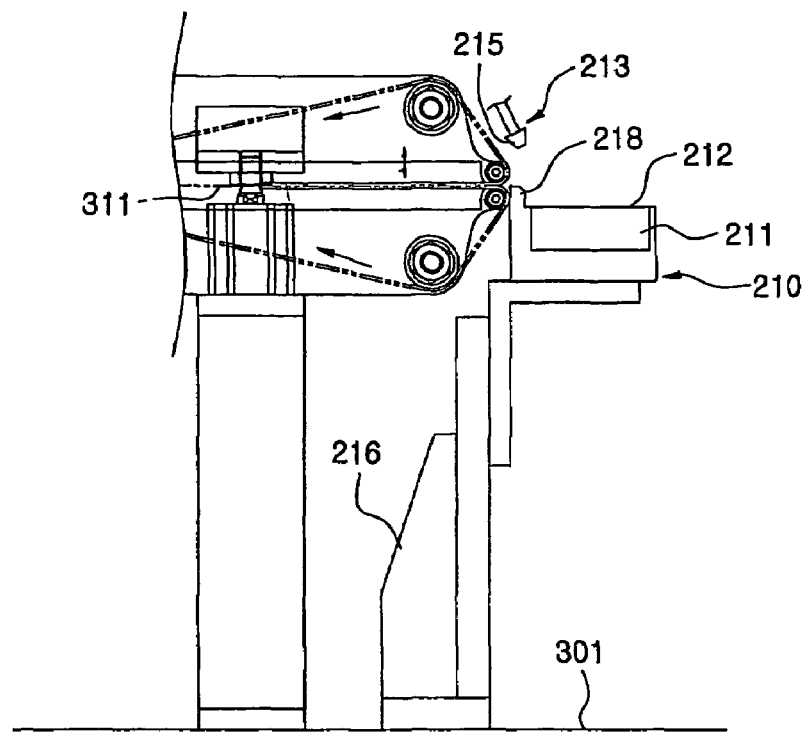
FIGS. 9A and 9B are expanded front and plan views of a base member portion shown in FIG. 8.
Figure 9B:
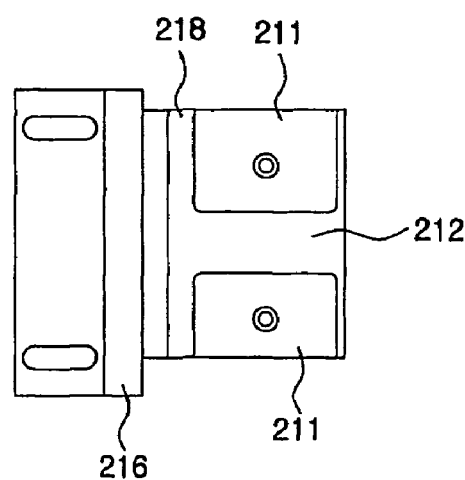

FIGS. 9A and 9B are expanded front and plan views of the portion of the base member of the packing unit.

Referring to FIGS. 9A and 9B, the base member 210 comprises a receiving rack 212 which has a planar shape and is installed at the base plate 216 installed at the frame 301, a guiding jaw 218 projected from the base plate 216 for guiding the supplied separator 311 toward the receiving rack 212, and a pair of recessed portions 211 recessed into both sides of the receiving rack 212. It is preferable that the upper surface of the guiding jaw 218 is disposed to be parallel to the travel path 313 and is specially surface-treated. The recessed portion 211 is a space into which a finger member 245 (FIGS. 11A and 11B) of the cutting/taping member 240 is inserted.

In addition, the base member 210 further comprises a biasing member 213 for biasing the separator 311 toward the direction opposite to the separator supplied direction, that is, toward the stopper member 220 so that the separator 311 supplied to the receiving rack 212 can be easily folded to be almost the shape of "Z". It is preferable that the biasing member 213 comprises an air nozzle 215 capable of pushing the separator 311 fluttering due to air blowing force toward the stopper member 220.

Figure 10A:
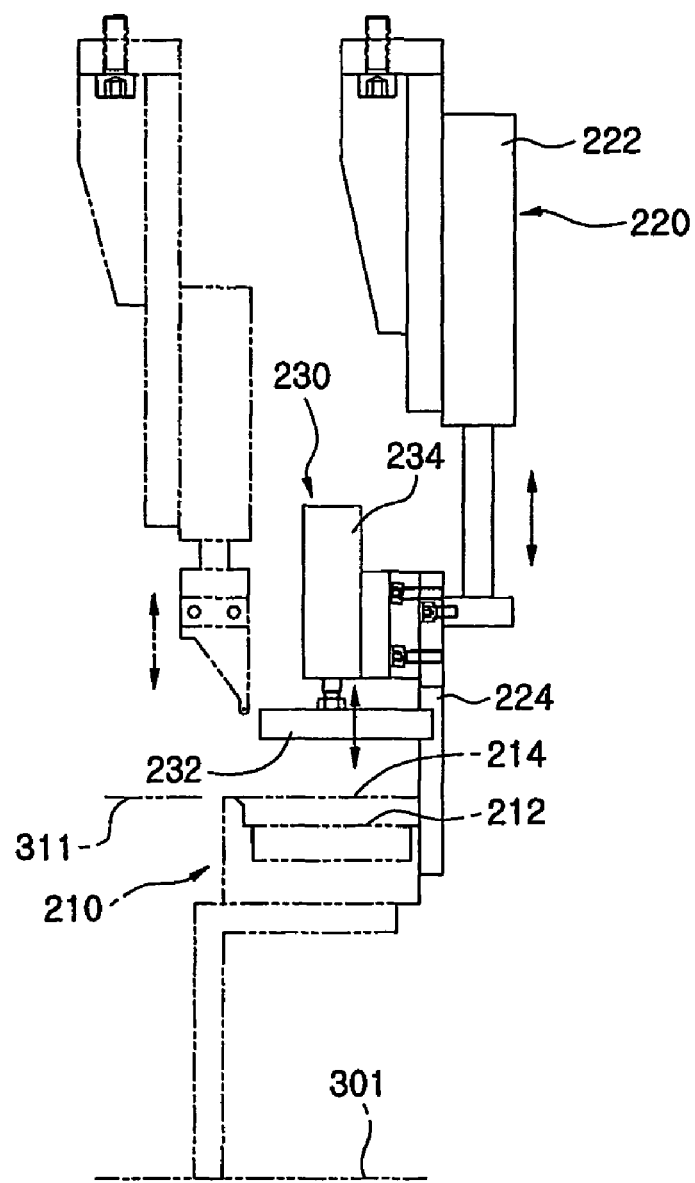
FIGS. 10A and 10B are front and right side views of a stopper member and a folder member shown in FIG. 8, respectively.
Figure 10B:
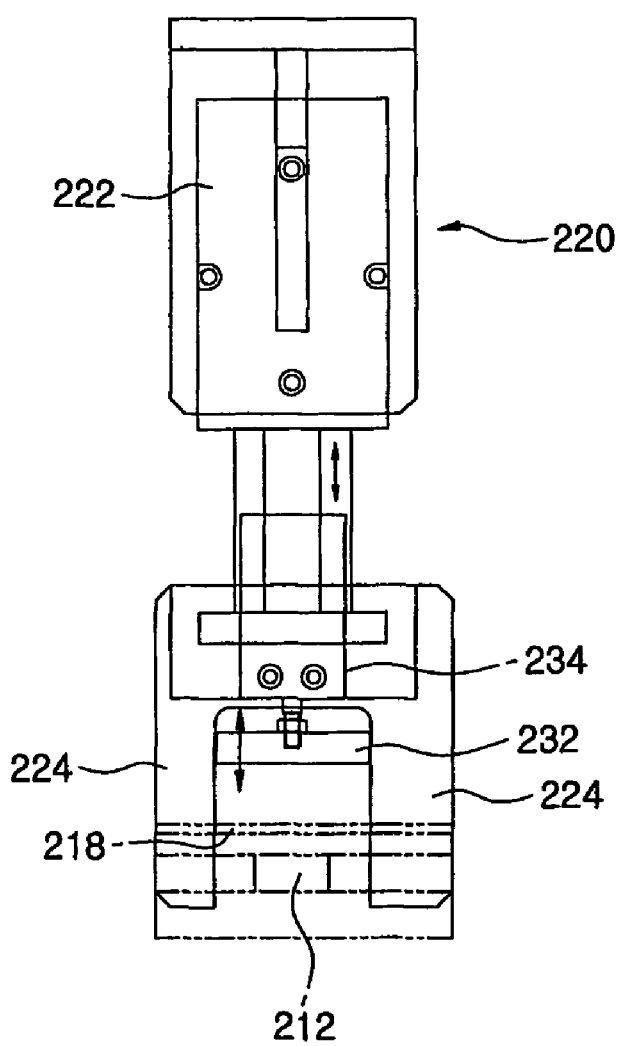

FIGS. 10A and 10B are front and right side views of the stopper member and the folder member shown in FIG. 1.

Referring to FIGS. 10A and 10B, the stopper member 220 is installed to be capable of being moved linearly back and forth with respect to the frame 301 by a stopper moving member 222 which is installed at the frame 301 and is controlled by the control unit so that the stopper member 220 can block selectively a side of the base member 210 to form the receiving space 214 and prevent the separator 311 supplied to the receiving rack 212 from being separated from the receiving rack 212. It is preferable that the stopper member 220 has two stopper forks 224 at its one end, and a vacant space is formed between the two stopper fork 224.

The folder member 230 is intended to continuously press and fold the separator 311 supplied to the receiving space 214 and biased toward the stopper member 220 so that the section of the separator 311 at both side portions of the positive electrode plates 102 and the negative electrode plates 104 can have the shape of "Z", and to cause the positive electrode plates 102 and the negative electrode plates 104 alternate with each other. The folder member 230 comprises a folder plate 232 disposed to be raised or lowered at a position corresponding to the receiving space 214, and a folder cylinder 234 which is installed at the stopper member 220 and controlled by the control unit. Therefore, during packing of a batch of the separator 311, while the stopper member 220 moves back and forth once, the folder plate 232 moves back and forth as many times as the number of electrode plates required for a battery, that is, the number of the positive electrode plates and the negative electrode plates which alternate with each other.

Figure 11A:
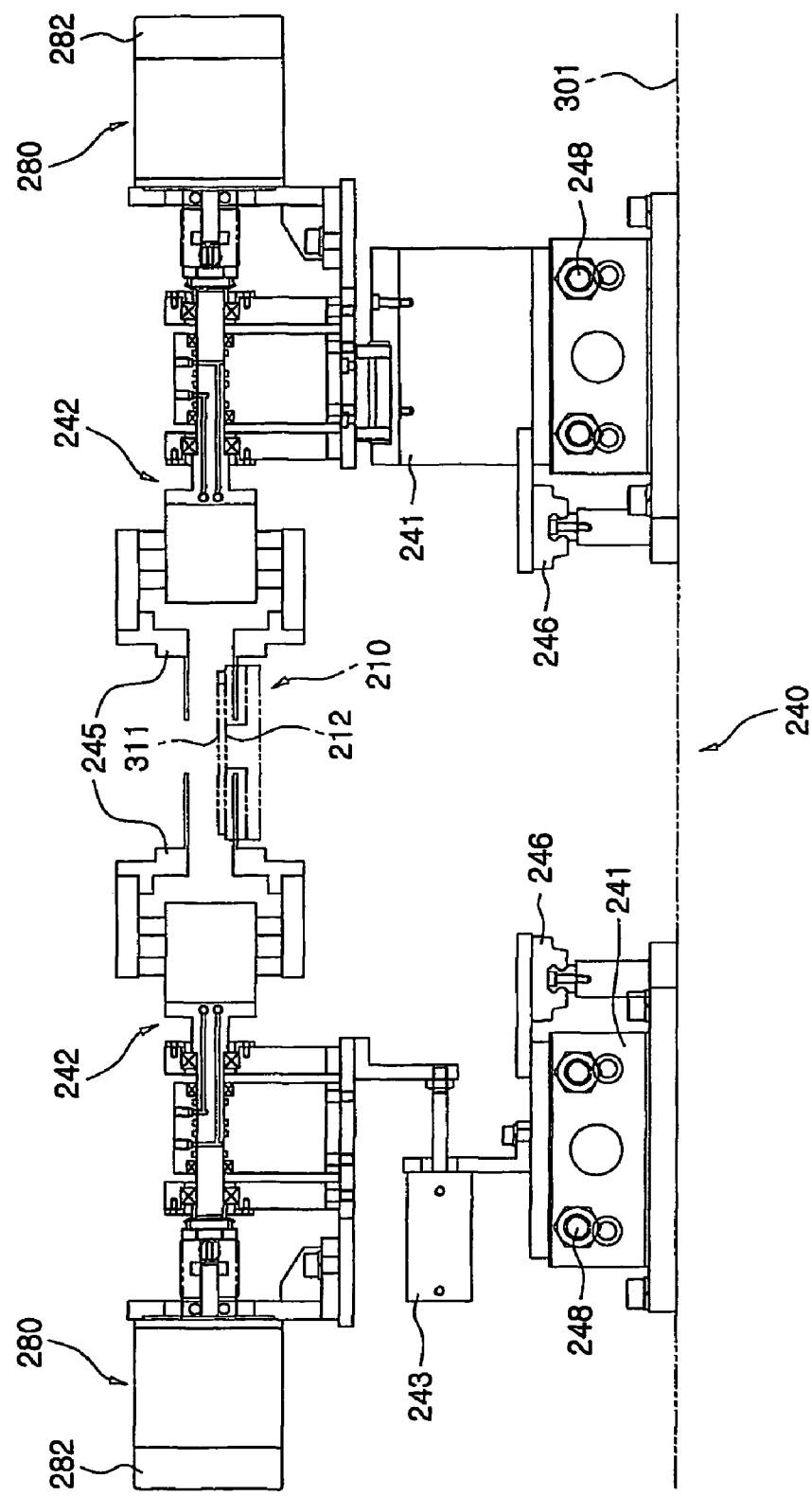
FIGS. 11A and 11B are front and right side views of a clamp member portion shown in FIG. 8.
Figure 11B:
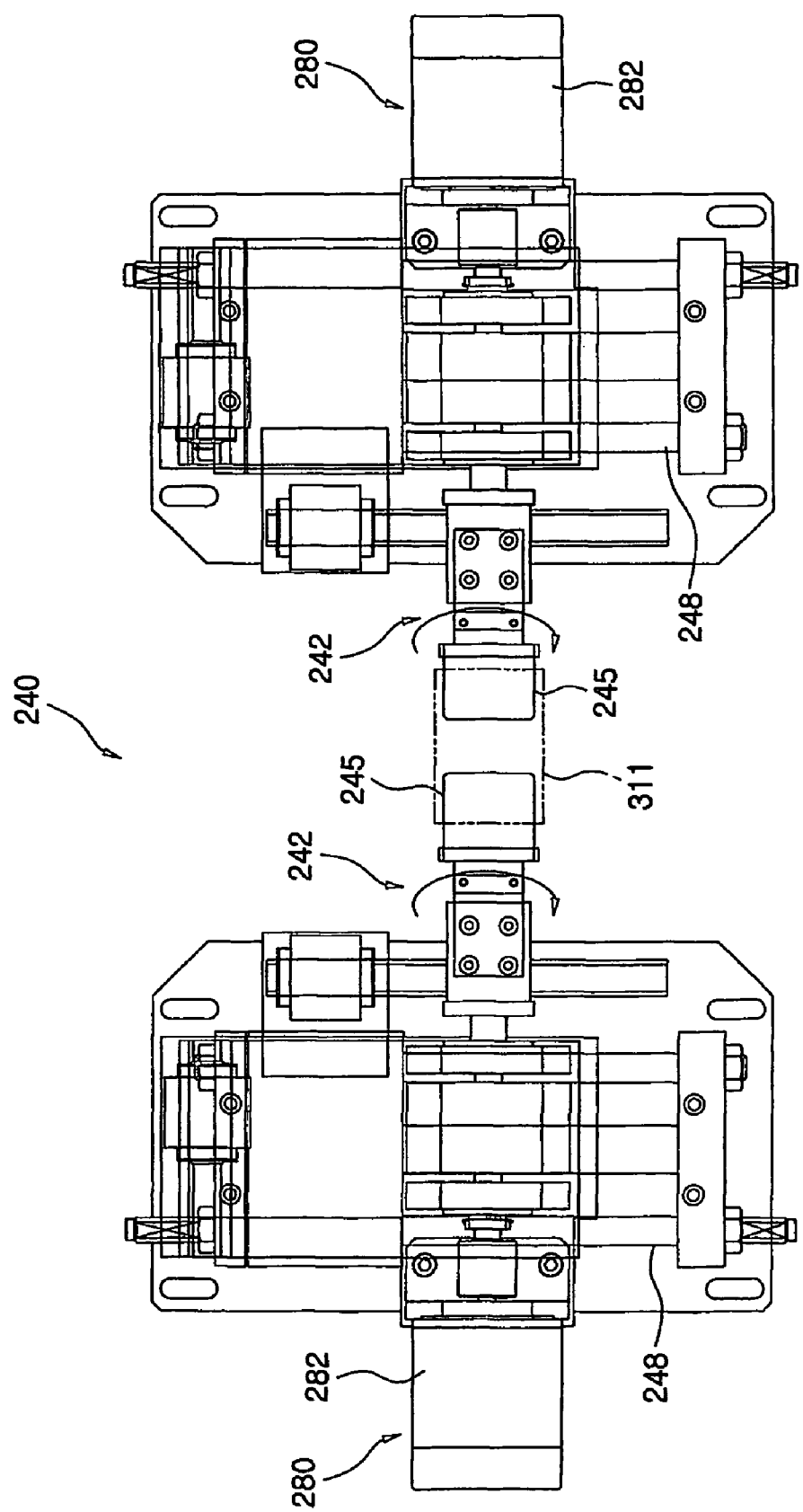

Referring to FIGS. 11A and 11B, the cutting/taping member 240 comprises a pair of clamp members 242 which approach both sides of the base member 210, clamp both sides of a piece of separator which is folded in the shape of "Z", and are moved horizontally to a taping position, a cutting member 250 (FIGS. 12A and 12B) installed at the frame 301 to be movable for cutting the separator 311 from above the base member 210 after the piece of separator 311 is moved by the clamp members 242, a tape supplying member 270 (FIG. 8) installed at the frame 301 so as to attach one end of a tape 262 to a piece of separator 311 after a tape roller 264 around which the tape 262 is wound is moved to the taping position through a tape travel path, clamp rotating members 280 (FIGS. 11A and 11B) installed at the frame 301 for rotating the clamp members 242 predetermined times so that the piece of separator can be taped while the piece of separator to which one end of the tape 262 is attached is rotated at both ends thereof, a tape cutting member 290 (FIG. 8A) installed at the frame 301 to be movable for cutting the loose end portion of the tape 262 extended from the packed piece of separator 311 which has been rotated by the clamp rotating members 280 and has been packed with the tape 262, and a holder member 244 installed at the frame 301 to be raised and lowered so that the holder member 244 can approach the tape supplying member 270 and contact the lower surface of the separator 311 to prevent the separator 311 from fluttering before the separator 311 is cut by the cutting member 250.

Referring to FIGS. 11A and 11B, the pair of clamp members 242 are installed to be symmetrical with respect to the travel path of the separator 311 and to be parallel to the frame 301. Each clamp member 242 comprises a movable block 241 which is moved back and forth between the base member 210 and the taping position along an LM guide 246 and guide rails 248 which are parallel to the travel path of the separator 311, and a pair of finger members 245 installed at the movable block 241 so as to clamp the piece of separator 311 while being positioned at the recessed portion 211 and being operated by an air cylinder 243.

Figure 12A:
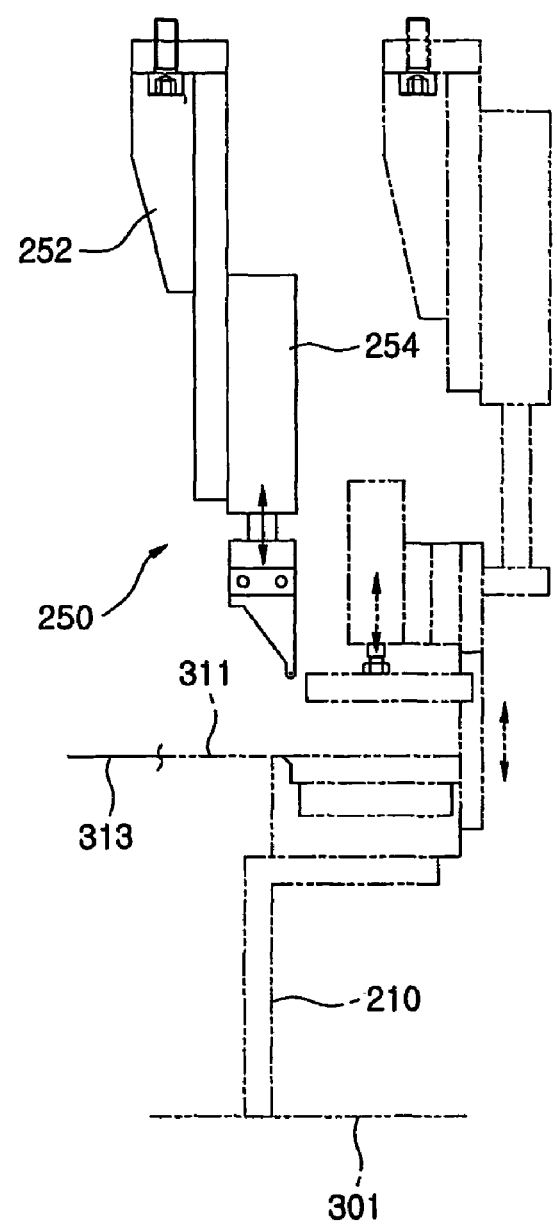
FIGS. 12A and 12B are front and right side views of a cutting member portion shown in FIG. 8.
Figure 12B:
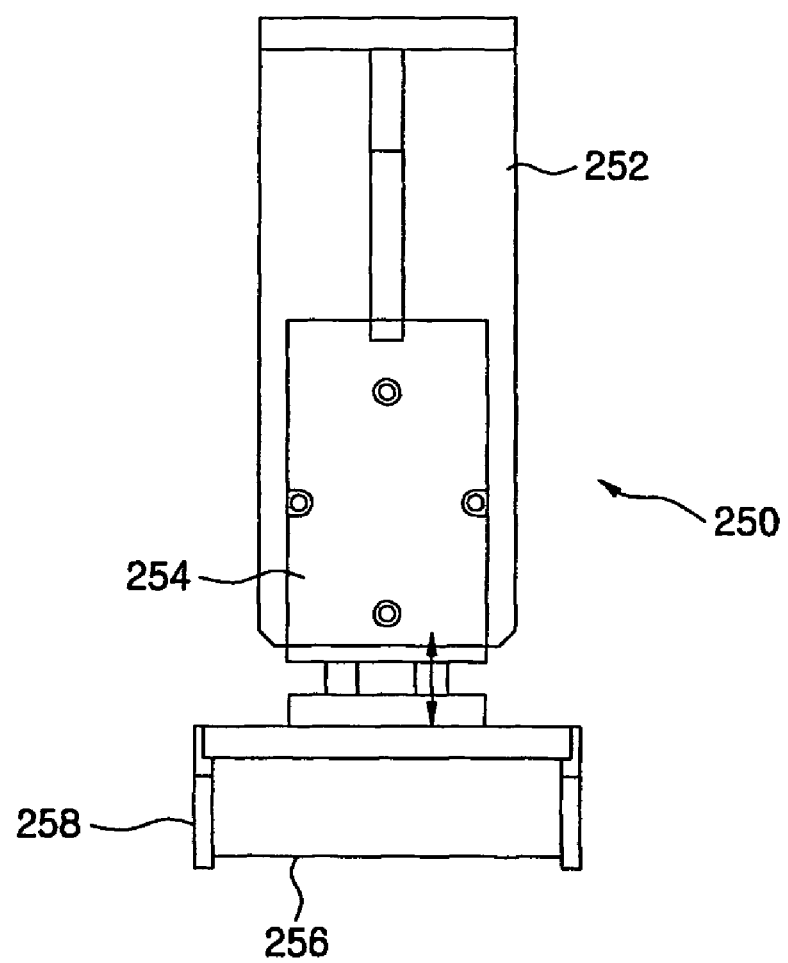

As shown in FIGS. 12A and 12B, the cutting member 250 is intended to cut the leading end of a non-attached area of the piece of separator 311 moved to the taping position by the clamp members 242, and comprises a heating cutter 258 which is provided with a heating wire 256. The heating cutter 258 is installed at one end of a cylinder 254 to be disposed over the travel path 313 so that the heating cutter 258 can be selectively moved toward the base member 210 by the cylinder 254 to contact the separator 311, and the heating wire 256 heated to a predetermined temperature can cut the separator 311. The cylinder 254 is supported by a bracket 252 which is installed at the frame 301.

Figure 13A:
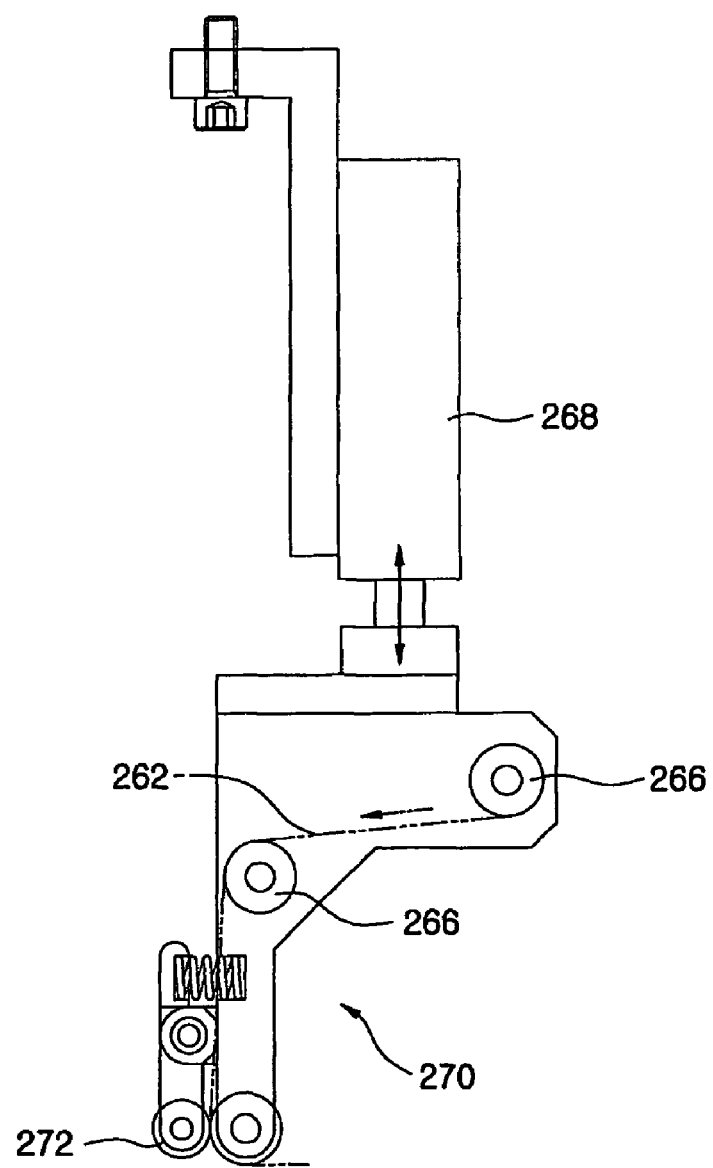
FIGS. 13A and 13B are front and right side views of a tape supplying member portion shown in FIG. 8.
Figure 13B:
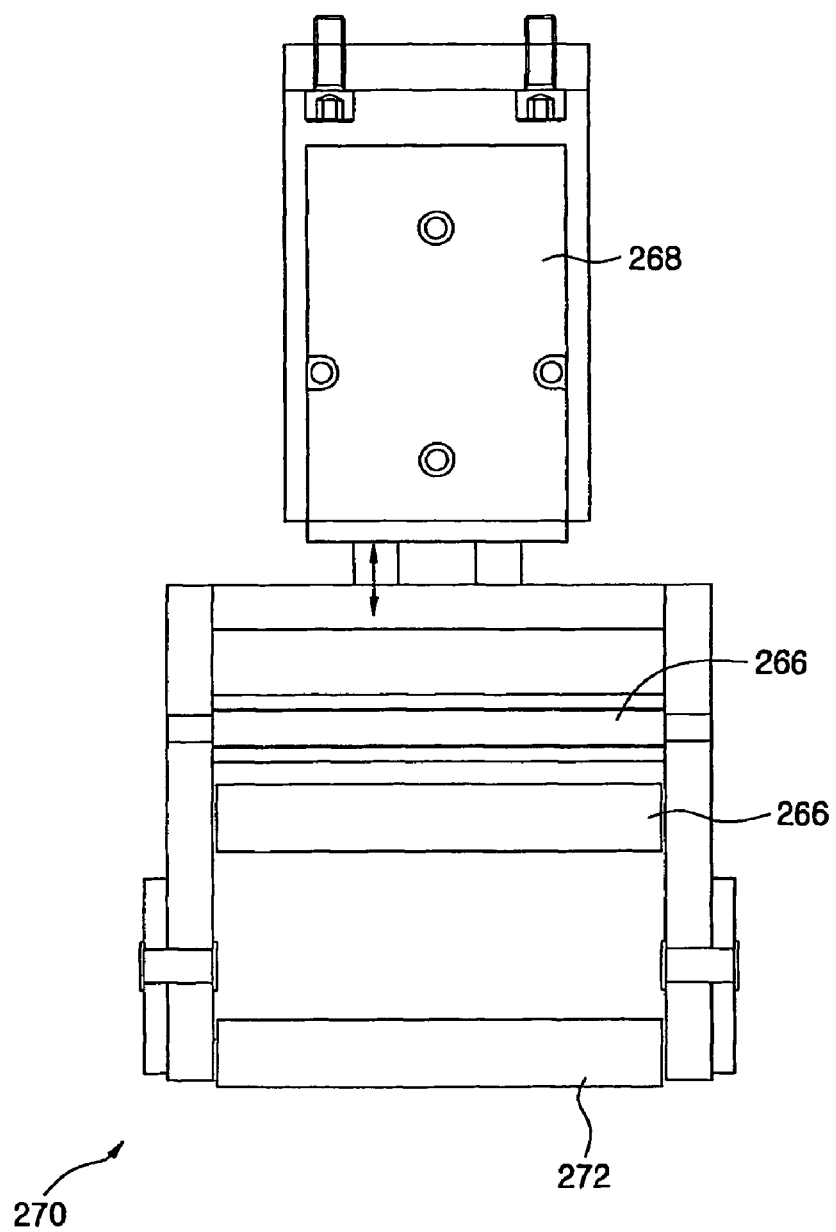

Referring to FIG. 1 and FIGS. 13A and 13B, the tape supplying member 270 comprises a tape supplying roller 264 and a plurality of tape guiding rollers 266 which are installed at the frame 301, and a pair of tape attaching rollers 272 which are installed at one end of a cylinder 268 installed at the frame 301 to be raised or lowered by the cylinder 268 and are positioned on the travel path of the tape 262 so that one end of the tape 262 can selectively contact the upper surface of the separator 311.

Figure 14A:
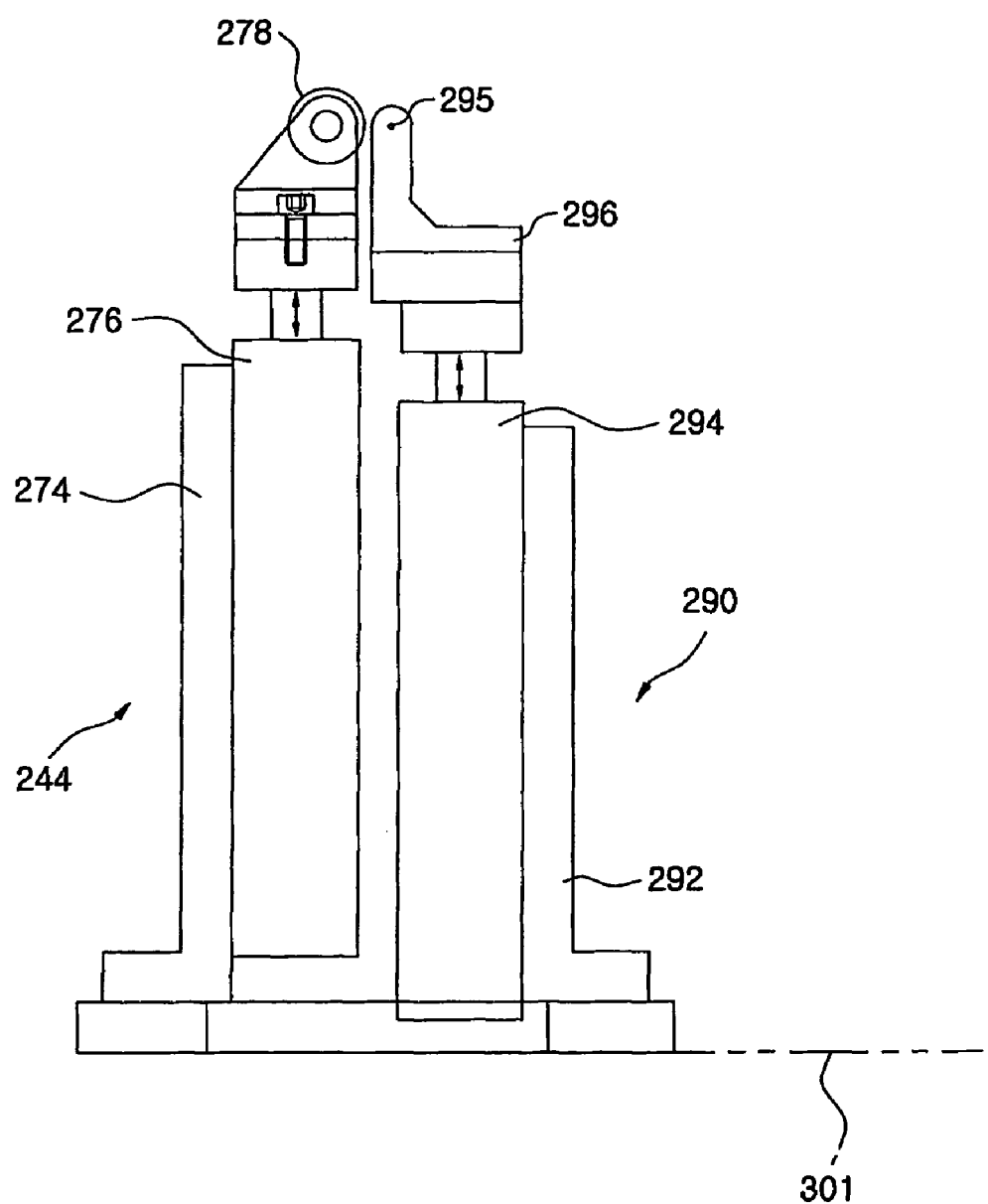
FIGS. 14A, 14B, and 14C are views of a holder member portion shown in FIG. 8.
Figure 14B:
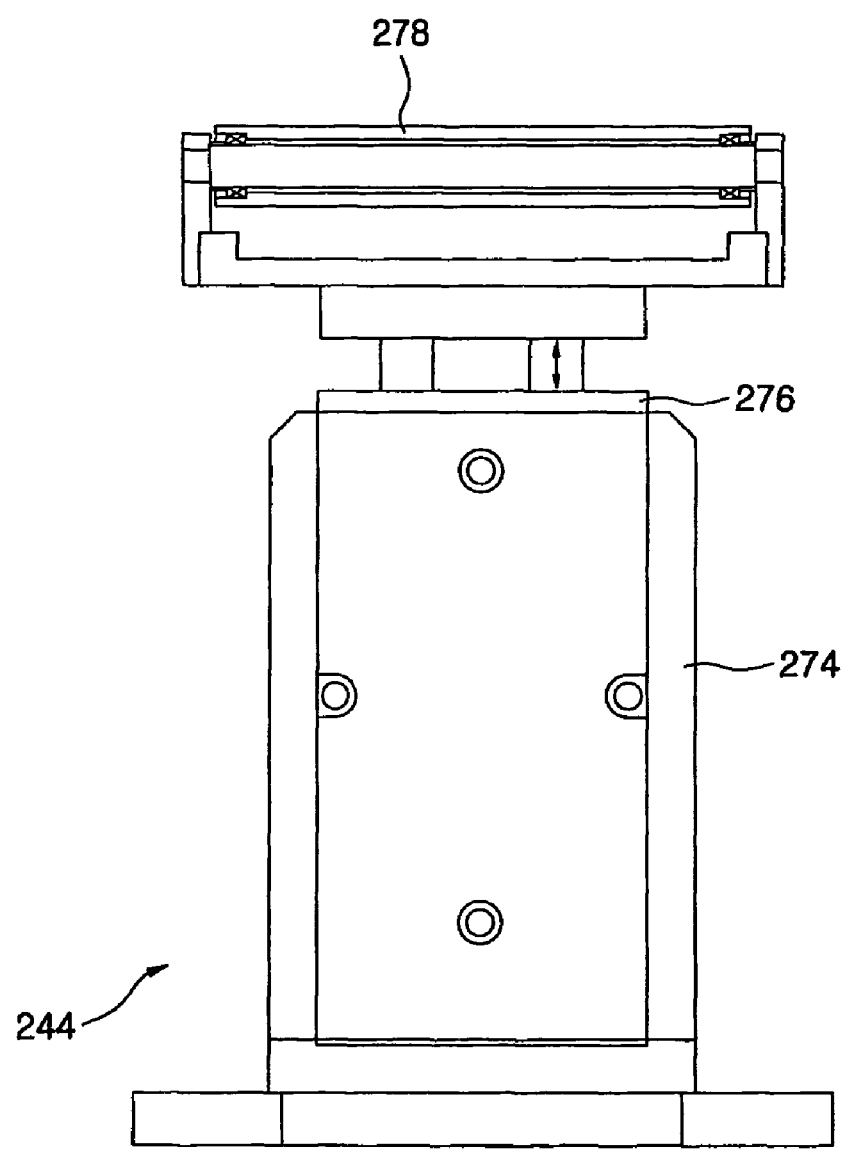

As shown in FIGS. 14A and 14B, the holder member 244 is disposed to correspond to the tape attaching rollers 272. The holder member 242 is intended to prevent a non-attached area of the separator 311 from fluttering since the separator 311 is cut before a piece of separator 311 is taped, and, therefore, the fluttering occurs. To this end, the holder member 244 comprises a bracket 274 installed at the frame 301, and a holding roller 278 installed so as to be selectively raised and lowered by a cylinder 276 installed at a bracket 274 until the holding roller 278 contact the lower surface of the separator 311.

As shown in FIGS. 11A and 11B, each of the clamp rotating members 280 comprises a stepping motor 282 installed at the movable block 241 so that the axis of rotation of the stepping motor 282 can be coaxial with that of the finger members 245, and, therefore, the clamp rotating member 280 can rotate the finger members 245 with the rotational force thereof.

Figure 14C:
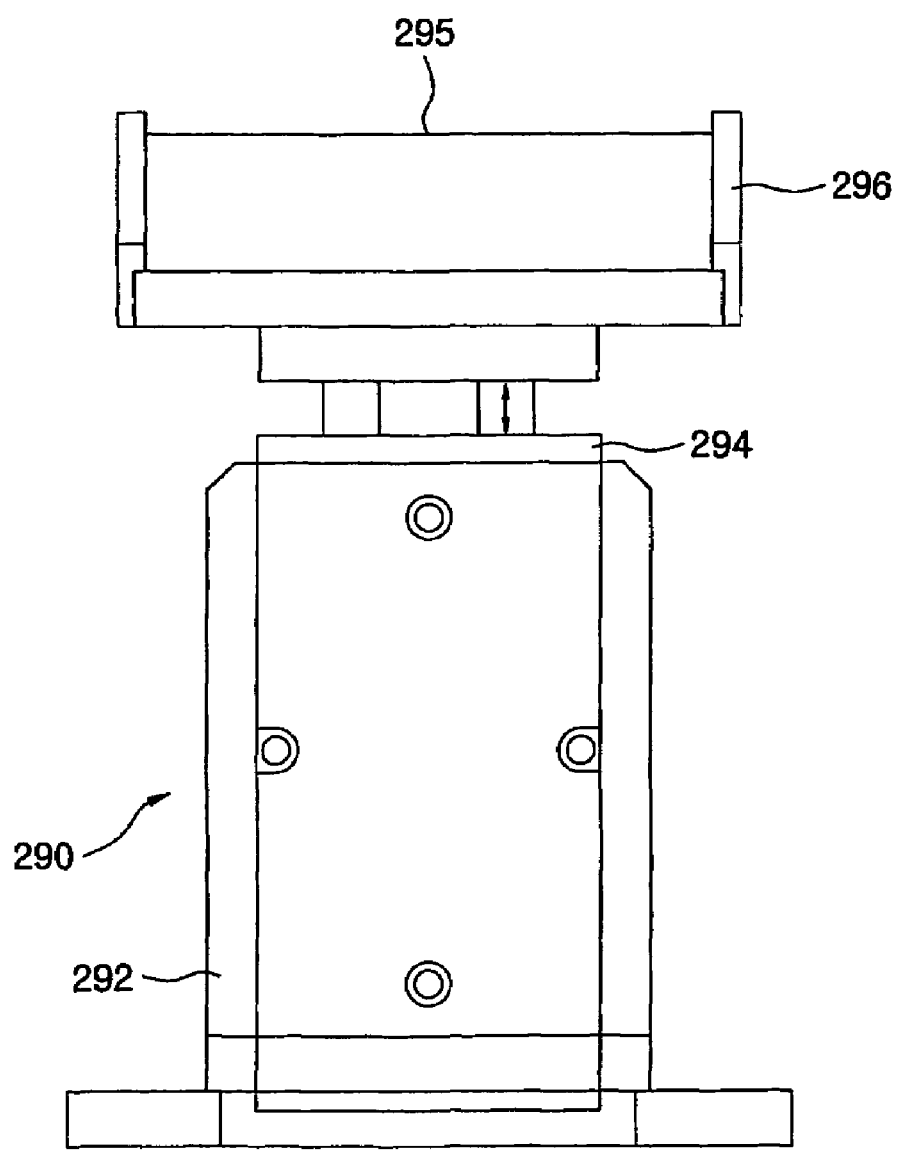

As shown in FIGS. 14A and 14C, the tape cutting member 290 is installed at the frame 301 to be close to the holder member 244 so that the tape cutting member 290 can be rotated by the clamp rotating member 280 (FIGS. 11A and 11B), and cut the loose end portion of the tape 262 (FIGS. 8A) extended from the packed piece of separator 311. The tape cutting member 290 comprises a bracket 292 installed at the frame 301, and a cutting body 296 having a cutting wire 295 for heating and cutting the tape 262, which is raised and lowered by a cylinder 294 which is installed at the bracket 292 and is operated below the travel path by the control unit.

Figure 15A:
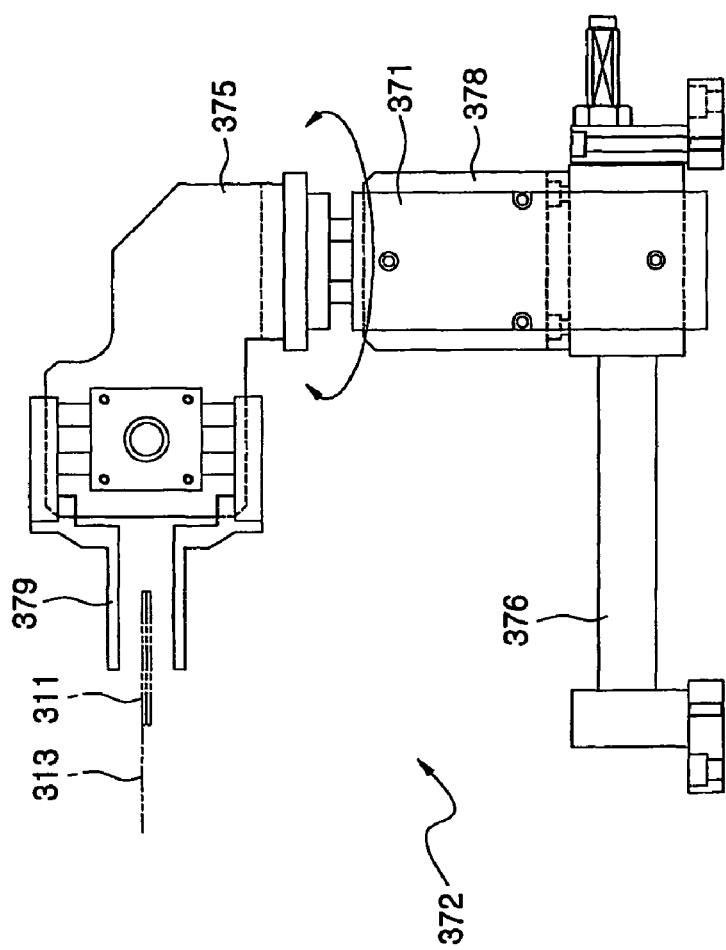
FIGS. 15A, 15B, and 15C are views of a first unloading member portion shown in FIG. 1 and FIG. 8.
Figure 15B:
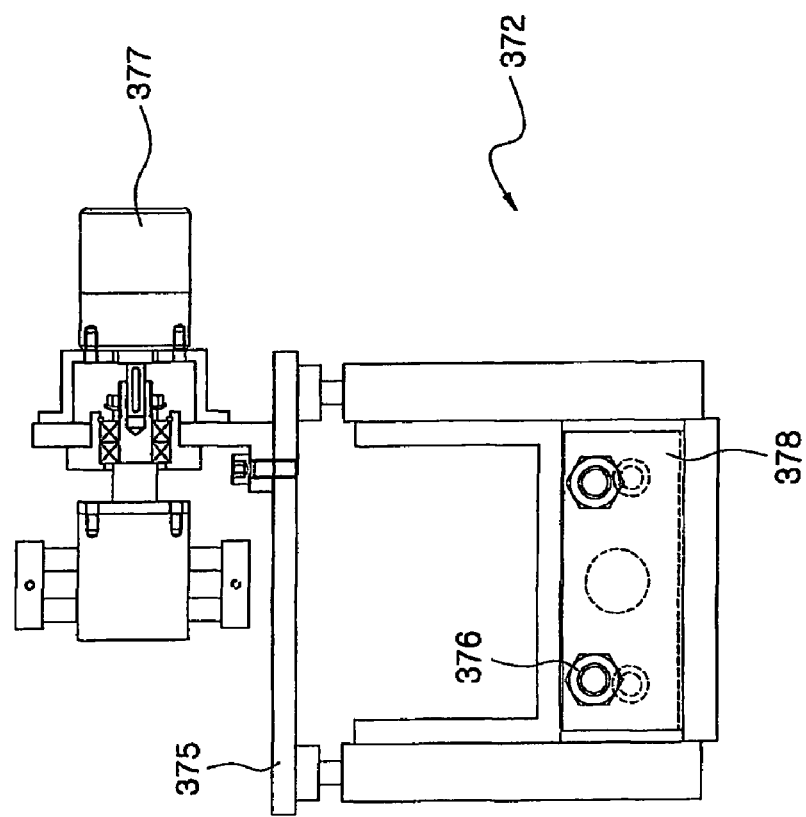
Figure 15C:
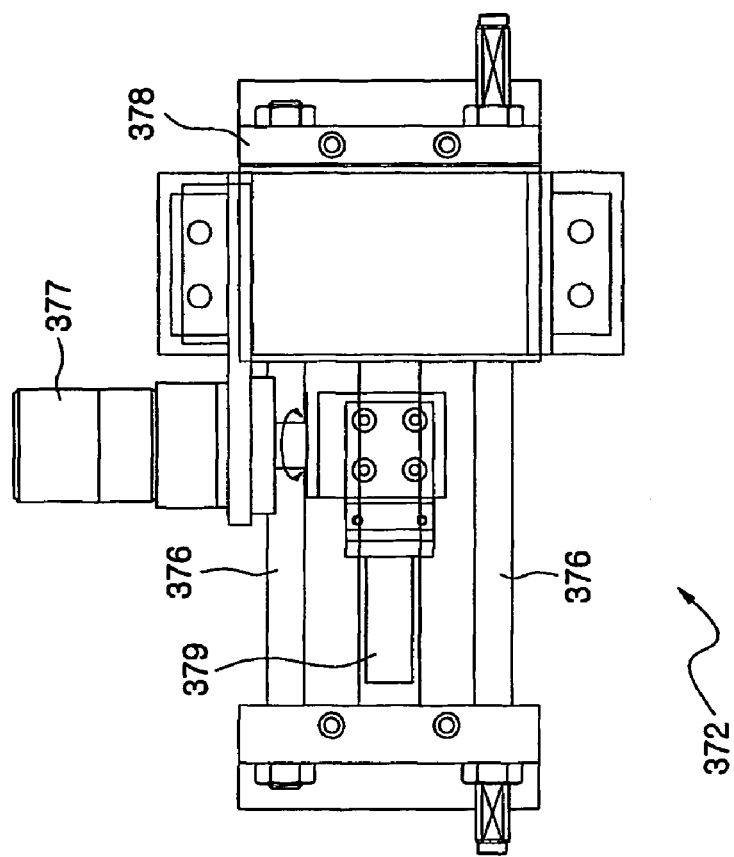
Figure 16A:
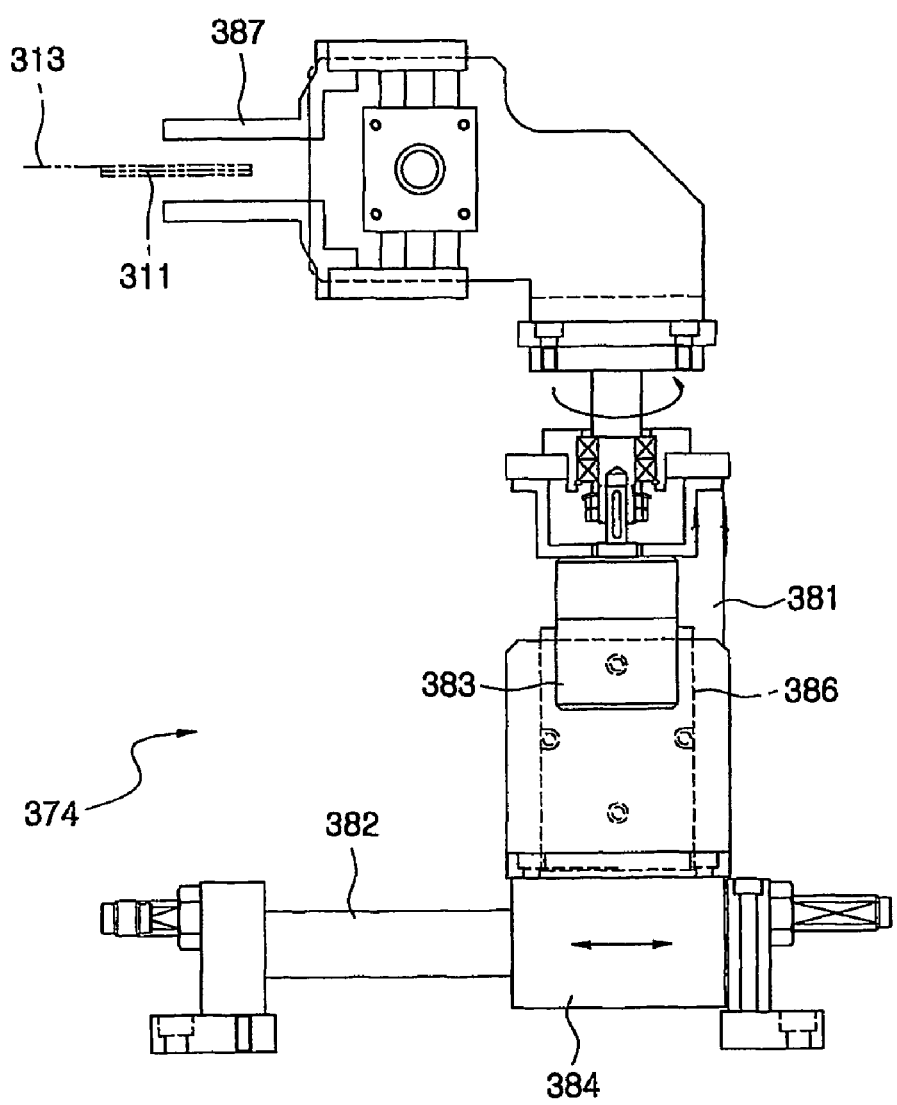
FIGS. 16A, 16B, and 16C are views of a second unloading member portion shown in FIG. 1 and FIG. 8.
Figure 16B:
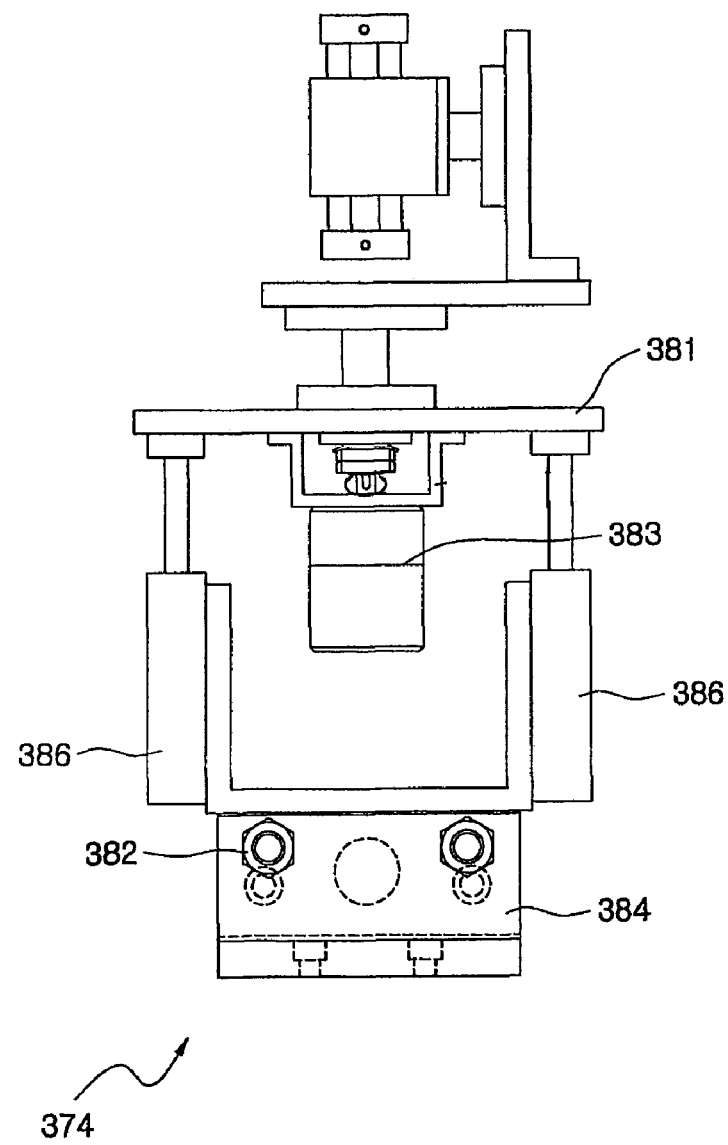
Figure 16C:
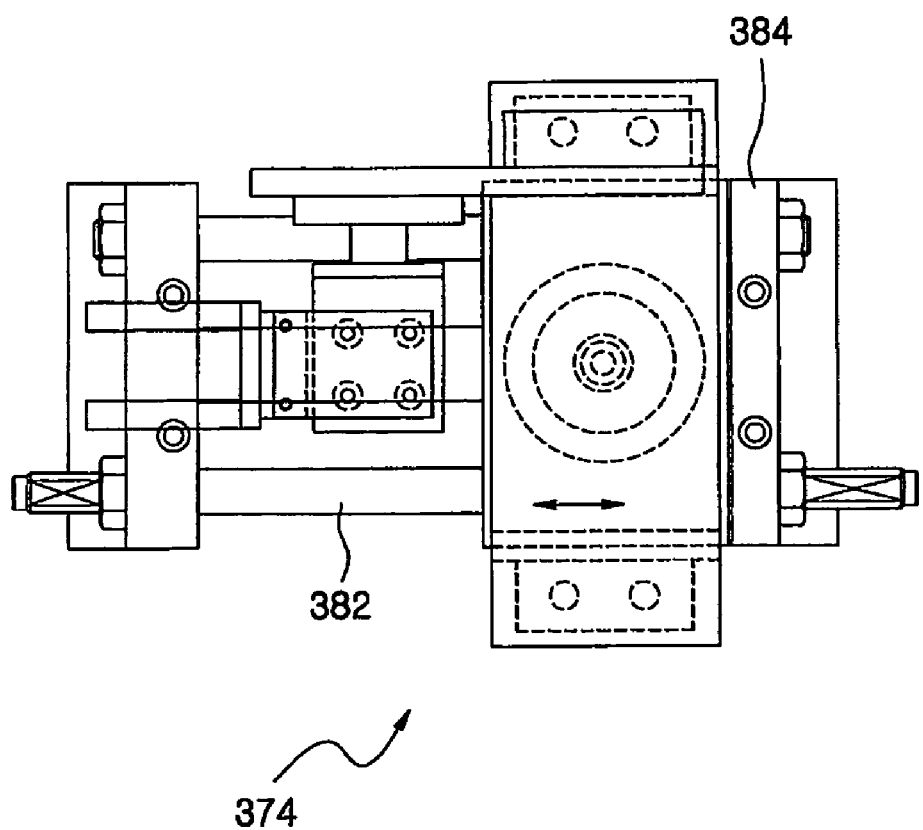

In addition, referring to FIG. 1, the unloading unit 360 is intended to unload a packed piece of separator 311 packed at the packing unit 350 to the tray unit 370, and comprises a first unloading member 372 (FIGS. 15A through 15C) and a second unloading member 374 (FIGS. 16A through 16C).

As shown in FIGS. 15A through 15C, the first unloading member 372 comprises a first unloading horizontal block 378 which is linearly movable in a direction parallel to the travel path 313 along a guide rail 376, a first pivotable bracket 375 installed to be raised and lowered by a first vertical cylinder 371 installed at the first unloading horizontal block 378, first air fingers 379 which are installed at the first pivotable bracket 375 so as to be rotated vertically by an angle of 180° by a first rotary member 377 for being passed a piece of separator 311 held by the finger members 245 of the clamp members 242.

As shown in FIGS. 16A through 16C, the second unloading member 374 comprises a second unloading horizontal block 384 which is linearly movable in a direction parallel to the travel path 313 along a guide rail 382, a second pivotable bracket 381 installed to be raised and lowered by a second vertical cylinder 386 installed at the second unloading horizontal block 384, second air fingers 387 which are installed at the second pivotable bracket 381 so as to be rotated horizontally by an angle of 180° by a second rotary member 383 for being passed the piece of separator 311 held by the first air fingers 379 and unloading the piece of separator 311 to trays 391 of the tray unit 370.

In addition, as shown in FIG. 1, the system 300 further comprises a second position adjusting member 351 installed at the frame 301 so as to adjust positions of the transporting unit 340, the packing unit 350, and the unloading unit 360 collectively, and, therefore, so as to set the relative positions of the components with respect to the frame 301 to correspond to a number of electrode plates to be laminated.

The second position adjusting member 351 comprises a movable plate 353 on which the transporting unit 340, the packing unit 350, and the unloading unit 360 are fixedly installed, an LM guide 355 interposed between the frame 301 and the movable plate 353, and a second hand (not shown) installed at the frame 301 for moving the movable plate 353.

Figure 17A:
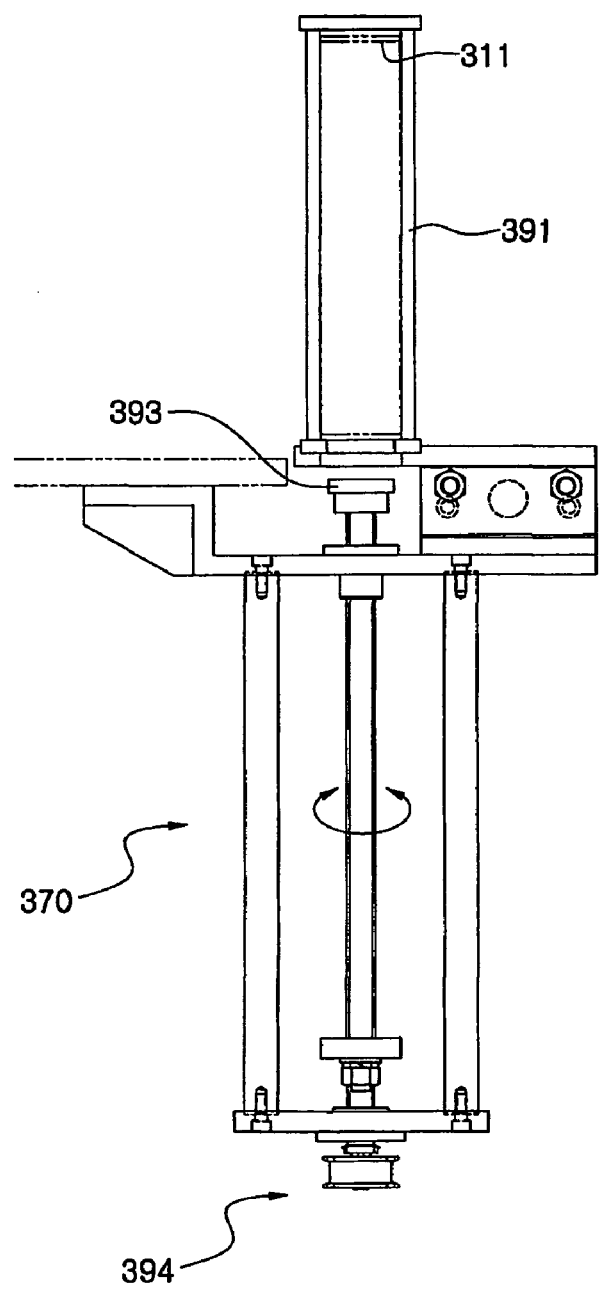
FIGS. 17A and 17B are views of a tray unit portion shown in FIG. 1 and FIG. 8.
Figure 17B:
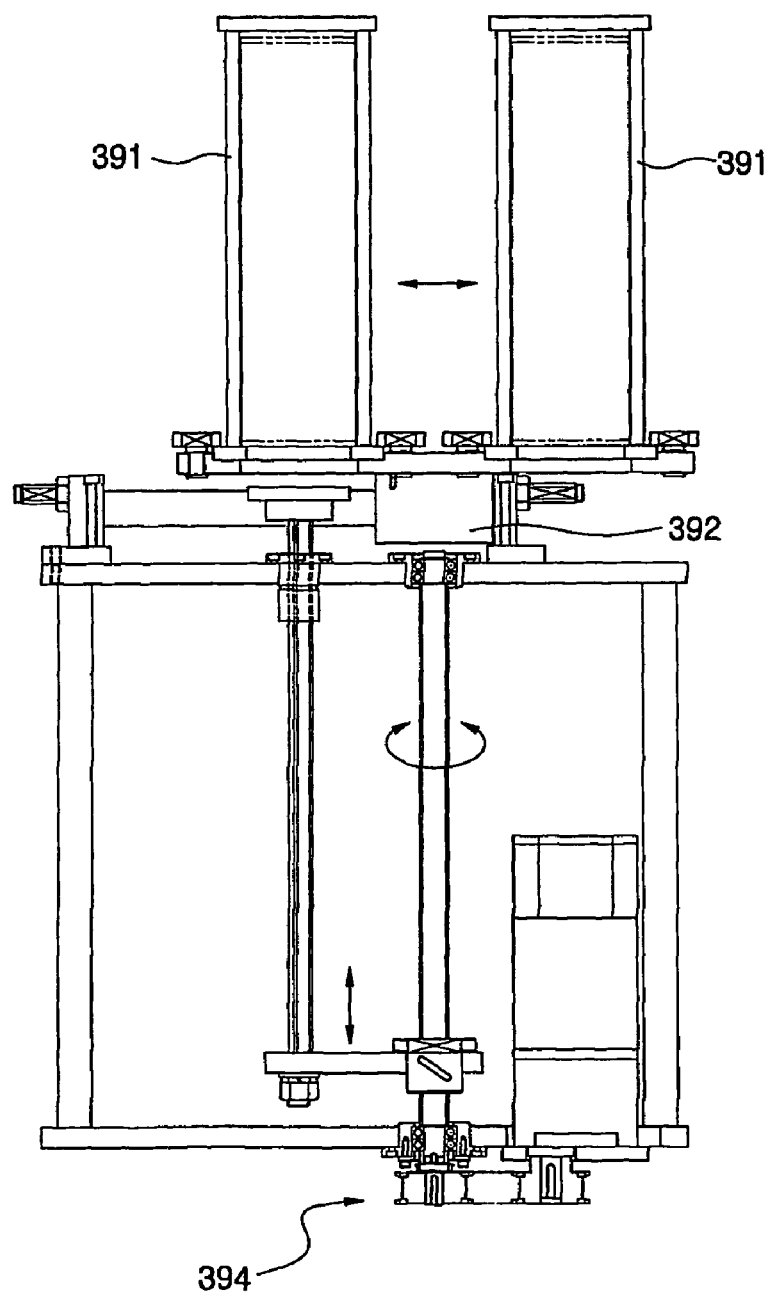

As shown in FIGS. 17A and 17B, the tray unit 370 comprises a tray moving member 392 installed to be movable with respect to the frame 301 so as to utilize a pair of trays 391 alternately, a receiving pad 393 for receiving a piece of separator 311 unloaded to any one of the inner spaces of the trays 391, a receiving-pad moving member 394 installed at the frame 301 to be movable vertically so that the position of the receiving pad 393 can be adjusted according to the number of the pieces of separator 311 accumulated on the receiving pad 393.

The operation of the automated manufacturing system of a lithium secondary battery configured as above according to a preferred embodiment of the present invention will be described.

First, the power of the system 300 is turned on, and data required for the control unit is set. Then, the separator 311 wound around the separator roller 315 is drawn from the supply unit 310, is caused to position along the travel path 313 of the separator 311 in the adhesive applying unit 320 and the lamination unit 330, and is inserted into a gap between the conveyor members 343. These procedures can be performed after the operation mode of the control unit is changed into a manual mode so that the individual components can be moved manually or the gap between the components can be widened. Thereafter, positive electrode plates 102 and negative electrode plates 104 are stored in the positive-electrode-plate magazine 116 and the negative-electrode-plate magazine 118 of the lamination unit 330. In addition, quantity of adhesive required for the adhesive applying unit 320, the air system, and the like are checked. Whether or not all the components of the system 300 have been prepared for a normal operation can be confirmed in advance by changing the operation mode of the control unit into a warming-up mode.

Subsequently, when a start button of the control unit is pressed, the conveyor members 343 of the transporting unit 340 circulate. Then, the separator 311 interposed between the pair of conveyor members 343 is drawn to the tray unit 370, and, during this process, while the separator 311 wound around the separator roller 315 is guided by the guide rollers 317 of the supply unit 310, and the tension of the separator 311 is adjusted by the dancing roller 319, the separator 311 enters the adhesive applying unit 320.

Thereafter, while the separator 311 passes through the adhesive applying unit 320, adhesive is applied to both surfaces of the separator 311 by the nozzles of the air injectors 325 to form a predetermined adhesive pattern. The adhesive applied to the separator 311 is dried by dry air injected by the adhesive drying members 329. In addition, the separator 311 is stopped at a predetermined position of the lamination unit 330 while being guided by the travel guide member 322.

Subsequently, in a state that the separator 311 is stopped at the lamination unit 330, the control unit causes the stacking member 110 of the lamination unit 330 to operate. Then, the positive-electrode-plate pressing plates 106 and the negative-electrode-plate pressing plates 108 are moved toward the positive electrode plates 102 and the negative electrode plates 104, respectively, to press the electrode plates 102 and 104. Meanwhile, the positive-electrode-plate pivoting members 122 and the negative-electrode-plate pivoting members 124 are pivoted by an angle of 90° from a state in which the positive-electrode-plate pivoting members 122 and the negative-electrode-plate pivoting members 124 face the travel path 313 so as to face the positive-electrode-plate magazine 116 and the negative-electrode-plate magazine 118, respectively. In addition, the positive-electrode-plate pushing members 132 and the negative-electrode-plate pushing members 134 are moved toward the positive electrode plate 102 and the negative electrode plate 104, and hold a batch of positive electrode plates 102 and negative electrode plates 104 which are stored in the positive-electrode-plate magazine 116 and the negative-electrode-plate magazine 118 by using respective absorbing forces.

Thereafter, after the pushing members 132 and 134 have held the respective electrode plates 102 and 104, the pressing forces applied to the positive-electrode-plate pressing plates 106 and the negative-electrode-plate pressing plates 108 are released, and the positive-electrode-plate pivoting members 122 and the negative-electrode-plate pivoting members 124 are pivoted, in reverse directions, to face the travel path 313. Thereafter, the positive-electrode-plate pushing members 132 and the negative-electrode-plate pushing members 134 press the respective positive electrode plates 102 and the respective negative electrode plates 104 to both surfaces of the separator 311 positioned along the travel path 313, simultaneously. Then, the positive electrode plates 102 and the negative electrode plates 104 are attached to both surfaces of the separator 311 by respective adhesion forces of the adhesive applied to both surfaces of the separator 311, and, at the same time, the absorbing forces applied to the positive-electrode-plate pushing members 132 and the negative-electrode-plate pushing members 134 are released.

Thereafter, the separator 311 to which the positive electrode plates 102 and the negative electrode plates 104 have been attached are moved by the transporting unit 340, and, subsequently, a new batch of the separator 311 to which the adhesive were applied are supplied to the lamination unit 330.

During these steps, the aligned state of the positive electrode plates 102 and the negative electrode plates 104 respectively stored in the positive-electrode-plate storing portions 112 and the negative-electrode-plate storing portions 114 may become improper due to pressing forces of the positive-electrode-plate pressing plates 106 and the negative-electrode-plate pressing plates 108 and pushing forces of the positive-electrode-plate pushing members 122 and the negative-electrode-plate pushing members 124. In this case, the positive-electrode-plate aligning member 142 and the negative-electrode-plate aligning member 144 are operated so that the positive electrode plates 102 and the negative electrode plates 104 positioned at the leading ends of the positive-electrode-plate magazine 116 and the negative-electrode-plate magazine 118 can be aligned by the positive-electrode-plate aligning bar 141 and the negative-electrode-plate aligning bar.

In addition, a length of first one batch of the leading end portion of the separator 311 which have passed the transporting unit 340 must be cut away.

Thereafter, while the separator 311 passing through the leading ends of the conveyor members 343 of the transporting unit 340 is guided by the guiding jaw 218, the separator 311 begins to be supplied to the receiving rack 212 of the base member 210. In this step, the separator 311 is biased toward the stopper member 230 by the air blowing force generated by the air nozzle 215 of the biasing member 213.

In this state, the folder plate 232 of the folder member 230 continuously presses the separator 311 supplied to the receiving space 214 and biased by a predetermined times, and folds the separator 311 so that the sections of both sides of the separator 311 can have the shape of "Z", and the positive electrode plates 102 and the negative electrode plates 104 can alternate with each other. Then, the stopper member 220 is raised in a state that the folder plate 232 presses a piece of separator 311 against the receiving rack 212. Subsequently, the clamp members 242 of the cutting/taping member 240 are caused to approach the both sides of the base member 210, and clamp both sides of the piece of separator 311 folded in the shape of "Z". Together with the clamping operation, the folder plate 232 is raised.

Thereafter, the clamp members 242 are operated to move the piece of separator 311 horizontally to a taping position. Subsequently, the tape supplying member 270 is operated to cause the leading end of the tape 262 to adhere to the upper surface of the piece of separator 311 positioned at the taping position. At the same time, the holder member 244 is raised to cause the holding roller 278 to contact the lower surface of the separator 311. Therefore, since the tape attaching rollers 272 and the holding roller 278 hold the separator 311, the separator 311 does not flutter.

Subsequently, the cutting member 250 is lowered to cut the leading end of a non-attached area of the piece of separator 311. Then, the heating cutter 258 heated to a predetermined temperature cuts the separator 311.

Thereafter, while the piece of separator 311 to which the leading end of the tape 262 is adhered is rotated at both ends thereof, the clamp rotating members 280 are operated to tape the piece of separator 311. Then, the finger members 245 are rotated by the stepping motors 282, and, at the same time, the tape 262 supplied from the tape supplying member 270 is naturally wound around the piece of separator 311 to tape the piece of separator 311.

Subsequently, the tape cutting member 290 is operated to cut the loose end of the tape 262 extended from the taped piece of separator 311. Then, the cutting wire 295 is moved to cut the tape 262 by using heat, and the packing operation is finally completed.

Thereafter, after the first unloading air fingers 379 installed at the first unloading horizontal block 378 of the first unloading member 372 are passed the piece of separator 311 held by the finger members 245 of the of the clamp members 242, the first unloading air fingers 379 are moved horizontally and rotated vertically by an angle of 180°. Then, after the second unloading air fingers 387 of the unloading member 374 are passed the piece of separator 311 from the first air fingers 379, the second unloading air fingers 387 is moved vertically and, then, rotated vertically by an angle of 180°, and lay the piece of separator 311 on the tray 391. The second unloading member 374 is returned to its original position in reverse order to the above-described order.

During these operations, the transporting unit 240 is continuously supplying the separator 311 from the supply unit 310 to the adhesive applying unit 320, the adhesive applying unit 320 is applying the adhesive to another batch of separator 311, and the lamination unit 330 laminates the separator 311 with a batch of positive and negative electrode plates 102 and 104.

In addition, when the tray 391 of the tray unit 370 is full of pieces of separator 311, the tray 391 is separated from the tray unit 370, and the other vacant tray 391 disposed thereby is moved horizontally to an unloading position. Meanwhile, the tray 391 full of the pieces of separator 311 unloads the received pieces of separator 311 to a separate space, and the vacant tray 391 is positioned again at a spare position.

As described above, the automated manufacturing system of a lithium secondary battery according to the present invention has the following advantages.

First, the overall efficiency of production thereof can be enhanced due to the employment of the automated manufacturing system, and a rate of defective secondary batteries can be lowered.

Second, since the travel path of the separator is arranged to be horizontal, a row of positive electrode plates and a row of negative electrode plates, i.e., a batch of positive and negative electrode plates are attached and laminated to both surfaces of the separator at the same time, efficiency of the manufacturing operations and productivity of secondary batteries can be enhanced.

Third, in the adhesive applying unit 320, since a predetermined pattern of adhesive applied portions are formed by applying the printing principle of Ink-jet Marking, contact areas between a adhesive layer and an electrode plate and a thickness of the adhesive layer can be reduced, and, therefore, excessive use of adhesive can be prevented and the so-called string effect can be reduced, and, ultimately, electron (or ion) conductivity of the electrode plate can be enhanced. In addition, a quantity of adhesive being sprayed can be controlled with ease.

Fourth, since standardized, well-arranged magazines are employed, events in which electrode plates are inadequately aligned when the electrode plates are laminated to the separator can be prevented. Therefore, productivity of secondary batteries and quality thereof can be enhanced.

Fifth, since the separator both surfaces of which positive electrode plates and negative electrode plates are attached to, respectively, can be folded by serialized operations of the receiving rack, the stopper member, and the pressing plate so that both side sections of the folded separator can have the shape of "Z", productivity of secondary batteries can be enhanced markedly.

Sixth, since folded pieces of separator can be continuously moved, and taped by automated robot equipments, productivity of secondary batteries and efficiency of manufacturing processes can be enhanced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An automated manufacturing system of a secondary lithium battery comprising:

a frame;

a supply unit having a separator roller installed at the frame to be rotatable so that a separator can be released from the separator roller, and can travel along a separator travel path;

an adhesive applying unit disposed to have the separator travel path through the adhesive applying unit so as to continuously apply adhesive to both surfaces of the separator in a predetermined pattern;

a lamination unit installed at the frame for laminating one adhesive applied surface of the separator with a plurality of positive electrode plates, and the other adhesive applied surface of the separator with a plurality of negative electrode plates simultaneously so that the electrode plates can correspond to the above pattern;

a transporting unit installed at the frame to be rotatable while contacting the separator so as to periodically cause the separator supplied from the supply unit to travel along the travel path at a predetermined speed via the adhesive applying unit and the lamination unit;

a packing unit installed at the frame for folding and packing a batch of the separator which is laminated with the electrode plates by the lamination unit in a predetermined pattern and is transported by the transporting unit so that the positive electrode plates and the negative electrode plates can alternate with each other, and both side sections of the folded separator can have the shape of "Z", the packing unit further including:

a base member which is installed at the frame, and is provided with a receiving rack for receiving a batch of separator, both surfaces of which are laminated with positive electrode plates and negative electrode plates in a predetermined pattern;

a stopper member installed at the frame to be linearly movable so as to selectively approach one end of the base member for preventing the separator being supplied to the base member from being separated from the receiving rack;

a folder member installed at the frame to be linearly movable with respect to the receiving rack so that the folder can press the separator supplied to a receiving space formed by the receiving rack and the stopper member for predetermined duration, and fold the separator so that both side sections of the folded separator can have the shape of "Z", and the positive electrode plates and the negative electrode plates can alternate with each other;

a cutting/taping member for moving the separator folded in the shape of "Z" to a predetermined area, cutting the separator at a non-electrode area to which no electrode plate is attached, and taping the folded and cut piece of separator; and an unloading unit installed at the frame to be movable for unloading the packed separator to a tray unit.

2. The automated manufacturing system of a secondary lithium battery claimed as in claim 1, wherein the travel path between the supply unit and the packing unit is arranged to be horizontal with respect to a floor.

3. The automated manufacturing system of a secondary lithium battery claimed as in claim 1, wherein the supply unit comprises:

a plurality of guide rollers installed at the frame to be positioned along the travel path; and a dancing roller installed at a dancing arm installed at the frame to be pivotable for storing a predetermined length of separator released from the separator roller, and for supplying the separator to the adhesive applying unit while controlling the tension of the separator.

4. The automated manufacturing system of a secondary lithium battery claimed as in claim 1, wherein the supply unit further comprises a stopper member installed to be close to the supply unit for selectively stopping the separator traveling continuously.

5. The automated manufacturing system of a secondary lithium battery claimed as in claim 1, wherein the adhesive applying unit comprises a pair of air injectors installed at the frame so that the distance between the injectors and the travel path can be adjusted, and the injectors can face each other.

6. The automated manufacturing system of a secondary lithium battery claimed as in claim 5, wherein each air injector comprises a plurality of nozzles capable of injecting adhesive with compressed air so that a unit adhesive applied portion having a doughnut shape can be formed on a surface of the separator.

7. The automated manufacturing system of a secondary lithium battery claimed as in claim 1, wherein the adhesive applying unit further comprises adhesive drying members installed to be close to the separator for drying the adhesive injected on both surfaces of the separator by the adhesive applying unit.

8. The automated manufacturing system of a secondary lithium battery claimed as in claim 1, wherein the adhesive applying unit further comprises a first position adjusting member installed between the frame and the adhesive applying unit for adjusting the position of the adhesive applying unit with respect to the frame.

9. The automated manufacturing system of a secondary lithium battery claimed as in claim 1, wherein the system further comprises a travel guide member installed at the frame to be position between the adhesive applying unit and the lamination unit for guiding the separator traveling along the travel path.

10. The automated manufacturing system of a secondary lithium battery claimed as in claim 1, wherein the lamination unit comprises:

a stacking member provided with a plurality of positive-electrode-plate storing portions each of which a multitude of positive electrode plates are stored in, and which are disposed equidistantly, and a plurality of negative-electrode-plate storing portions each of which a multitude of negative electrode plates are stored in, and which are disposed equidistantly, and are installed at the frame to be asymmetrical to the positive-electrode-plate storing portions about the separator to which adhesive has been applied to in a predetermined pattern;

pairs of pivoting members installed at the frame to pivot so as to face the positive-electrode-plate storing portions and the negative-electrode-plate storing portions, respectively; and pushing members installed to be linearly movable with respect to the respective pivoting members so as to approach the stacking member and the separator to attach the positive electrode plates and the negative electrode plates which are stored in the stacking member to the separator.

11. The automated manufacturing system of a secondary lithium battery claimed as in claim 10, wherein the stacking member further comprises pressing means for pressing the positive electrode plates and the negative electrode plates which are stored in the positive-electrode-plate storing portions and the negative-electrode-plate storing portions, respectively, against the respective pivoting members.

12. The automated manufacturing system of a secondary lithium battery claimed as in claim 11, wherein each of the pressing means comprises:

an elongated hole provided at each of the positive-electrode-plate storing portions and the negative-electrode-plate storing portions; and a pressing plate which has a pressing projection to be inserted into the elongated hole, and is installed at the frame to be linearly moved by a moving member.

13. The automated manufacturing system of a secondary lithium battery claimed as in claim 12, wherein each of the pressing means further comprises an elastic member installed at the pressing projection so as to give an elastic force to corresponding one of the positive electrode plates and the negative electrode plates.

14. The automated manufacturing system of a secondary lithium battery claimed as in claim 10, wherein each of the pushing members further comprises a cushion member which corresponds to one of the positive electrode plates and the negative electrode plates, and is provided with a passage communicating with an absorbing member so as to hold the corresponding electrode plate stored in the stacking member with an absorbing force, and so as to attach to the separator.

15. The automated manufacturing system of a secondary lithium battery claimed as in claim 10, wherein the lamination unit further comprises aligning members installed to be linearly movable with respect to the stacking member so as to align the positive electrode plates or the negative electrode plates stored in the stacking member.

16. The automated manufacturing system of a secondary lithium battery claimed as in claim 1, wherein the transporting unit comprises a pair of conveyor members installed at the frame so as to circulate while contacting the separator, and so as to allow the separator to pass through a gap therebetween.

17. The automated manufacturing system of a secondary lithium battery claimed as in claim 16, wherein the pair of conveyor members are arranged to be separated from one another when necessary.

18. The automated manufacturing system of a secondary lithium battery claimed as in claim 1, wherein the base member comprises:
a guiding jaw projected from a base plate to guide the separator supplied thereto; and
a pair of recessed portions recessed into both sides of the receiving rack.

19. The automated manufacturing system of a secondary lithium battery claimed as in claim 1, wherein the base member further comprises a biasing member installed at the frame for biasing the separator toward the stopper member so that the separator supplied to the receiving rack can be easily folded in the shape of "Z".

20. The automated manufacturing system of a secondary lithium battery claimed as in claim 1, wherein the stopper member has a stopper fork for blocking both sides of the base member, and is linearly moved by a stopper moving member.

21. The automated manufacturing system of a secondary lithium battery claimed as in claim 1 wherein the folder member comprises a folder plate moved by a folder moving member.

22. The automated manufacturing system of a secondary lithium battery claimed as in claim 1, wherein the cutting/taping member comprises:
a pair of clamp members for approach both sides of the base member, clamping both sides of a piece of separator folded in the shape of "Z", and moving the piece of separator horizontally to a taping position;
a cutting member installed at the frame to be movable for cutting the separator at the leading end of the base member after the separator has been moved by the clamp member;
a tape supplying member installed at the frame to attach one end of tape to the piece of separator after a tape roller around which the tape is wound is moved along a tape travel path;
clamp rotating members installed at the frame for rotating the clamp members predetermined times so that the piece of separator can be taped while the piece of separator to which one end of the tape is attached is rotated at both ends thereof; and
a tape cutting member installed at the tape supplying member to be movable for cutting the loose end portion of the tape extended from the packed piece of separator which has been rotated by the clamp rotating members and has been packed with the tape.

23. The automated manufacturing system of a secondary lithium battery claimed as in claim 22, wherein the cutting/taping member further comprises a holder member installed at the frame to be raised and lowered so that the holder member can approach the tape supplying member and contact one surface of the separator to prevent the separator from fluttering before the separator is cut by the cutting member.

24. The automated manufacturing system of a secondary lithium battery claimed as in claim 1, wherein the unloading unit comprises:
a first unloading member installed at the frame so that the first unloading member can clamp the piece of separator packed at the packing unit, move linearly toward the tray unit, pivot by an angle of 180°, and move vertically; and
a second unloading member installed at the frame so as to clamp the separator clamped by the first unloading member, and unload the separator to the tray unit by pivoting by an angle of 180° and moving vertically.

25. The automated manufacturing system of a secondary lithium battery claimed as in claim 1, wherein the system further comprises a second position adjusting member installed at the frame for collectively adjusting positions of the transporting unit, the packing unit and the unloading unit to correspond to the number of electrode plates to be laminated.

* * * * *